US007432938B1

(12) United States Patent
Reuter et al.

(10) Patent No.: US 7,432,938 B1
(45) Date of Patent: Oct. 7, 2008

(54) SYSTEM AND METHOD FOR ANNOTATING ELECTRONIC DOCUMENTS

(75) Inventors: Ronald Lee Reuter, Omaha, NE (US); Tamara Jean Fuller, Omaha, NE (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 08/699,261

(22) Filed: Aug. 19, 1996

(51) Int. Cl.
*G06F 17/00* (2006.01)
*G09G 5/00* (2006.01)

(52) U.S. Cl. .................. 345/619; 345/418; 345/672; 715/230; 715/232

(58) Field of Classification Search ................ 395/773; 707/512, 530; 345/418, 619, 672, 680; 715/512, 715/530, 700, 230, 232, 764
See application file for complete search history.

(56) References Cited

U.S. PATENT DOCUMENTS

| 5,146,552 | A | * | 9/1992 | Cassorla et al. | 395/145 |
| 5,231,578 | A | * | 7/1993 | Levin et al. | 364/419 |
| 5,367,623 | A | * | 11/1994 | Iwai et al. | 395/157 |
| 5,537,526 | A | * | 7/1996 | Anderson et al. | 707/512 |
| 5,559,942 | A | * | 9/1996 | Gough et al. | 395/155 |
| 5,581,682 | A | * | 12/1996 | Anderson et al. | 707/530 |
| 5,596,700 | A | * | 1/1997 | Darnell et al. | 395/340 |
| 5,625,833 | A | * | 4/1997 | Levine et al. | 395/800 |
| 5,689,717 | A | * | 11/1997 | Pritt | 707/512 |
| 5,806,079 | A | * | 9/1998 | Rivette et al. | 707/512 |
| 5,845,301 | A | * | 12/1998 | Rivette et al. | 707/512 |

OTHER PUBLICATIONS

Bernstein, Mark, "Storyspace: Hypertex and the Process of Writing", Hypertext/Hypermedia Handbook, Editors; Berk, Emily, Devlin, Joseph, pp. 529-533, 1991.*
"Electronic 'Stick-On' Notes Attach to Web Pages", *Law Technology Product News*, May 1996, p. 11.

* cited by examiner

*Primary Examiner*—Chante Harrison
(74) *Attorney, Agent, or Firm*—Robert G. Crouch; Kent A. Lembke; Marsh Fischmann and Breyfogle, LLP

(57) ABSTRACT

A system and method for annotating electronic documents is disclosed. The method for annotating displayable electronic documents generally includes the steps of receiving at least a first input from a first person, such as an annotator, generating, in response to the first input, at least one of a first annotation box and a first annotation which relates to a first portion of the electronic document, and linking at least one of the first annotation box and the first annotation with the first portion of the electronic document to which the first annotation relates via a displayable first reference link.

15 Claims, 21 Drawing Sheets

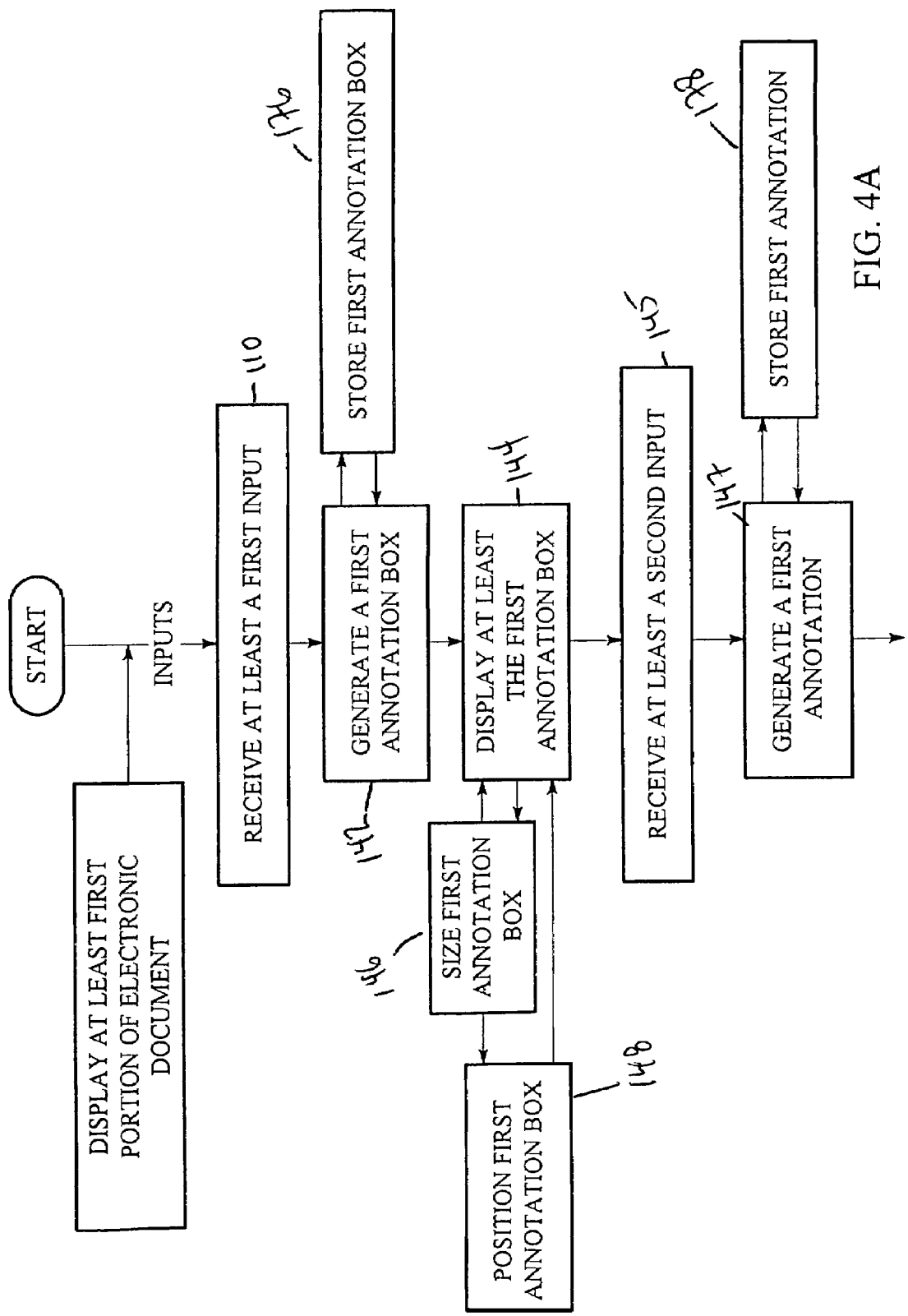

SYSTEM AND METHOD FOR ANNOTATING ELECTRONIC DOCUMENTS

FIELD OF THE INVENTION

The present invention generally relates to a system and method for annotating a document, and, more specifically, to a system and method for electronically annotating an electronic document.

BACKGROUND OF THE INVENTION

Over the years, various techniques have been developed to assist persons in providing annotative comments to documents. For example, in instances where portions of text of a paper document are to be annotated, an annotator may simply provide hand written annotations in the margins of the paper document, near the portions of the document to which the annotations apply. However, such hand written annotations on the paper document are not easily removable from the document and, may in fact be difficult to decipher, depending upon the neatness and penmanship of the annotator.

Text portions of a paper document may also be annotated by writing an annotative comment on an adhesive backed paper (e.g., Post-It™ pads, available from the Minnesota Mining and Manufacturing Company). An advantage of using such adhesive backed paper for providing annotative comments thereon is that a piece of such adhesive backed paper may be affixed to the paper at virtually any location on the face of the document (e.g., in the margin of the document or proximate the portion of the document to which the annotative comment applies). However, as hand written comments on the paper are difficult to revise or erase, and as the adhesive on such paper is relatively weak (e.g., mild), such adhesive backed papers are not readily reusable.

SUMMARY OF THE INVENTION

Accordingly, it is a primary object of the present invention to provide a system and method for annotating documents.

It is another object of the present invention to provide an easy-to-use, flexible system and method for annotating documents.

The present invention achieves one or more of the above objectives by providing a system and method for annotating electronic documents. In one aspect, the system of the present invention allows a first person to annotate at least a first portion of a first electronic document displayable to the first person via a display screen. The system generally includes a receiver for collecting a plurality of inputs from the first person, wherein a first of the plurality of inputs concerns generating at least one of a first annotation and a first annotation box displayable to at least the first person via the display screen and a second of the plurality of inputs concerns linking the one of the first annotation and first annotation box to the first portion of the first electronic document, a first processing means for processing the first of the plurality of inputs to generate the one of the first annotation and first annotation box displayable to at least the first person, and a second processing means for processing the second of the plurality of inputs to establish a first reference link between the one of the first annotation and first annotation box and the first portion of the document to which the one of the first annotation and first annotation box refers. Such first and/or second processing means may be implemented in a computer memory encoded with executable instructions representing a computer program that can cause a computer (e.g., the system) to generate the one of the first annotation and first annotation box displayable to at least the first person, and to establish a first reference link between the one of the first annotation and first annotation box and the first portion of the document to which the one of the first annotation and first annotation box refers.

In one embodiment, where the first of the plurality of inputs corresponds to generating the first annotation box, the system further includes a third processing means for processing a third plurality of inputs corresponding to generating the text of the first annotation, the text being displayable within the first annotation box. The functions of the third processing means may also be implemented in a computer memory encoded with executable instructions representing a computer program that can cause a computer (e.g., the system) to generate the text of the first annotation.

In another embodiment of the system of the present invention, the system accommodates annotators and/or viewers who wish to move an annotation box to review information of the electronic document covered or concealed by the annotation box. In this regard, the system is capable of processing inputs from a first person (e.g., annotator, viewer of annotated document) which concern moving the annotation box and/or annotation from a first location, relative to the first portion of the document to which the annotation refers, to a second location, relative to the first portion of the electronic document. To accommodate such inputs, the system of the present invention includes a means for processing such inputs to move the image of the annotation box, as displayed on the computer screen, accordingly. Such a processing means may be implemented in a computer memory encoded with appropriate executable instructions representing a computer program that can cause a computer (e.g., the system) to move the image of the annotation box from one location to another.

In another embodiment, the system includes a processing means for reconfiguring the reference link in instances where the first annotation box is moved from the first location to the second location. As such, a first annotation box and first annotation associated therewith may be moved to different locations, relative to the first portion of the electronic document, while preserving the link between the first annotation box and the first portion of the electronic document related thereto. In this regard, the system is especially useful in instances where the annotator or viewer of the document wishes to review a portion of the electronic document concealed or overlayed by an annotation box. In particular, where the reference link includes a first end associated with the annotation box and/or annotation and a second end associated with the first portion of the electronic document, the processing means is capable of reconfiguring the reference link such that the first end of the reference link moves with the first annotation box and the second end of the reference link remains associated with the first portion of the electronic document. Such a processing means for reconfiguring the reference link may be implemented in a computer memory encoded with appropriate executable instructions representing a computer program that can cause a computer (e.g., the system) to reconfigure the reference link, as described hereinabove.

The system of the present invention also includes at least one means for processing inputs directed to reconfiguring at least the first annotation box. In one embodiment, the system includes a processing means for reconfiguring the first annotation box into at least one of a collapsed condition, where the first annotation associated therewith is concealed, and an enlarged condition, where at least part of the first annotation is displayable to the annotator and/or viewer via the display screen. In another embodiment, the system includes a processing means for sizing at least the first annotation box. Such processing means for collapsing and enlarging the first annotation box and for sizing the first annotation box may be implemented in a computer memory encoded with executable instructions representing a computer program that can cause a computer (e.g., the system) to reconfigure and/or size annotation boxes.

In another aspect of the present invention, a method for annotating electronic documents is disclosed. Generally, the method for annotating at least a first electronic document displayable on a computer screen to a first person (e.g., first annotator) includes the steps of receiving at least a first input from the first person, generating, in response to the first input, at least one of a first annotation box and a first annotation displayable to the first person via the computer screen, the first annotation being displayable within the first annotation box and referring to a first portion of the electronic document, and linking at least one of the first annotation box and first annotation with the first portion of the electronic document to which the first annotation relates, via a displayable first reference link. As such, the method of the present invention provides an efficient and easy to use process for both annotating electronic documents and for reviewing annotated electronic documents.

In one embodiment, linking the first annotation box and first annotation displayable therein with the first portion of the electronic document includes the steps of receiving inputs from the first person (e.g., annotator) concerning establishing a reference link and generating a displayable reference link from such inputs. In particular, the step of generating the displayable reference link includes processing at least a first link input to establish a first end of displayable reference link, the first end being associated with the first annotation box, processing at least a second link input to generate a line extending from the first end of the reference link and processing at least a third link input to establish a second end of the displayable reference link, the second end being associated with the first portion of the electronic document to which the first annotation displayable with the first annotation box refers.

In another embodiment, the method further includes the steps of displaying at least the first annotation box, first portion of the document to which the first annotation displayable within the first annotation box refers, and the first reference link extending therebetween. In a preferred embodiment, the first annotation box is displayed adjacent the first portion of the electronic document, such that the first annotation box and first annotation displayable therein do not overlay or conceal the first portion of the electronic document. In this regard, an annotator and/or viewer of the electronic document can easily and conveniently view the first annotation and the first portion of the document to which the first annotation applies for purposes of possibly editing the document or verifying the information contained within the first portion of the electronic document.

In some instances however, an annotator or viewer of the electronic document may wish to review the information in a second portion of the electronic document which is concealed or partially concealed by the first annotation box and first annotation displayable therein. In this regard, the method of the present invention may further include the step of collapsing the first annotation box to a collapsed condition of reduced area, whereby the first annotation associated therewith is concealed and/or moving the first annotation box and first annotation displayable therein from a first location, proximate the second portion of the document, to a second location, away from the second portion of the document, such that the first annotation box and first annotation displayable therein does not overlay or conceal the second portion of the document. In one embodiment, in conjunction with the step of moving the first annotation box from a first location to a second location is the step of reconfiguring the first reference link between the first annotation box and the first portion of the electronic document. In particular, for purposes of preserving the link between the first annotation box and the first portion of the electronic document when the first annotation box is moved, the step of reconfiguring the first reference link includes the steps of determining, from at least one input from the first person, the second position of the first end of the first referencer, relative to at least one of the first position of the first end and the first portion of the first electronic document and positioning the first end of the first referencer at the second position, proximate the second location, along with at least one of the first annotation box and the first annotation.

In yet another embodiment, for purposes of facilitating review of the electronic document by an annotator or viewer thereof, the method of the present invention provides for concealing at least the first reference link which extends between the first annotation box and the first portion of the electronic document, such that the first reference link does not cover or overlay any portion of the electronic document. Concealing at least the first reference link may include the steps of receiving at least one input from an annotator or viewer and processing such input to generate an internal first reference link, which is revealable (e.g., displayable) upon receipt of another input form an annotator or viewer. Such a first reference link and/or internal first reference link may also be stored to provide a record of the reference link.

BRIEF DESCRIPTION OF THE DRAWINGS

FIGS. 4A-4B present a flow chart of another embodiment of the method for annotating an electronic document according to the present invention;

DETAILED DESCRIPTION

FIGS. 1 to 12A-12B illustrate embodiments of the system and method for annotating an electronic document, according to various features of the present invention. Generally, the system and method of the present invention facilitate the annotation of electronic documents and the review of electronic documents annotated according to the principles of the present invention. In accordance with the features of the present invention, the electronic document and annotations associated therewith are viewable by an annotator or viewer via a computer display screen (e.g., video display terminal). As such, the system and method of the present invention allow an annotator of an electronic document to provide displayable electronic annotations concerning specific, displayable portions of the text of the electronic document. Of primary importance, for purposes of assisting the annotator and/or reviewer of the displayable electronic document and annotations associated therewith, the system and method of the present invention allow the annotator of the electronic document to provide a displayable link (e.g., line, arrow) between each annotation and the portion of the electronic document to which each annotation relates. As such, the system and method of the present invention provide a means by which the annotator and/or reviewer of an electronic document and associated electronic annotations can quickly and readily examine, the portions of the electronic document to which each of the annotations refer. In this regard, the system and method of the present invention are particularly suited to the publishing and/or layout industries, where large electronic layout documents, such as telephone directories (e.g., yellow pages) are displayable on computer display screens and are subject to annotation.

The system for annotating an electronic document, illustrated in FIG. 1, generally includes at least a first receiver 24 for receiving a plurality of inputs from a first person 12 (e.g., annotator) and at least a first means for processing such inputs from the first person 12 in accordance with selected computer software programs, the pseudo-code of which is included hereinbelow, where appropriate. As such, the system may be implemented in various known computer systems (e.g., desktop or personal computers, Personal Digital Assistants ("PDAs")).

Figure 1:
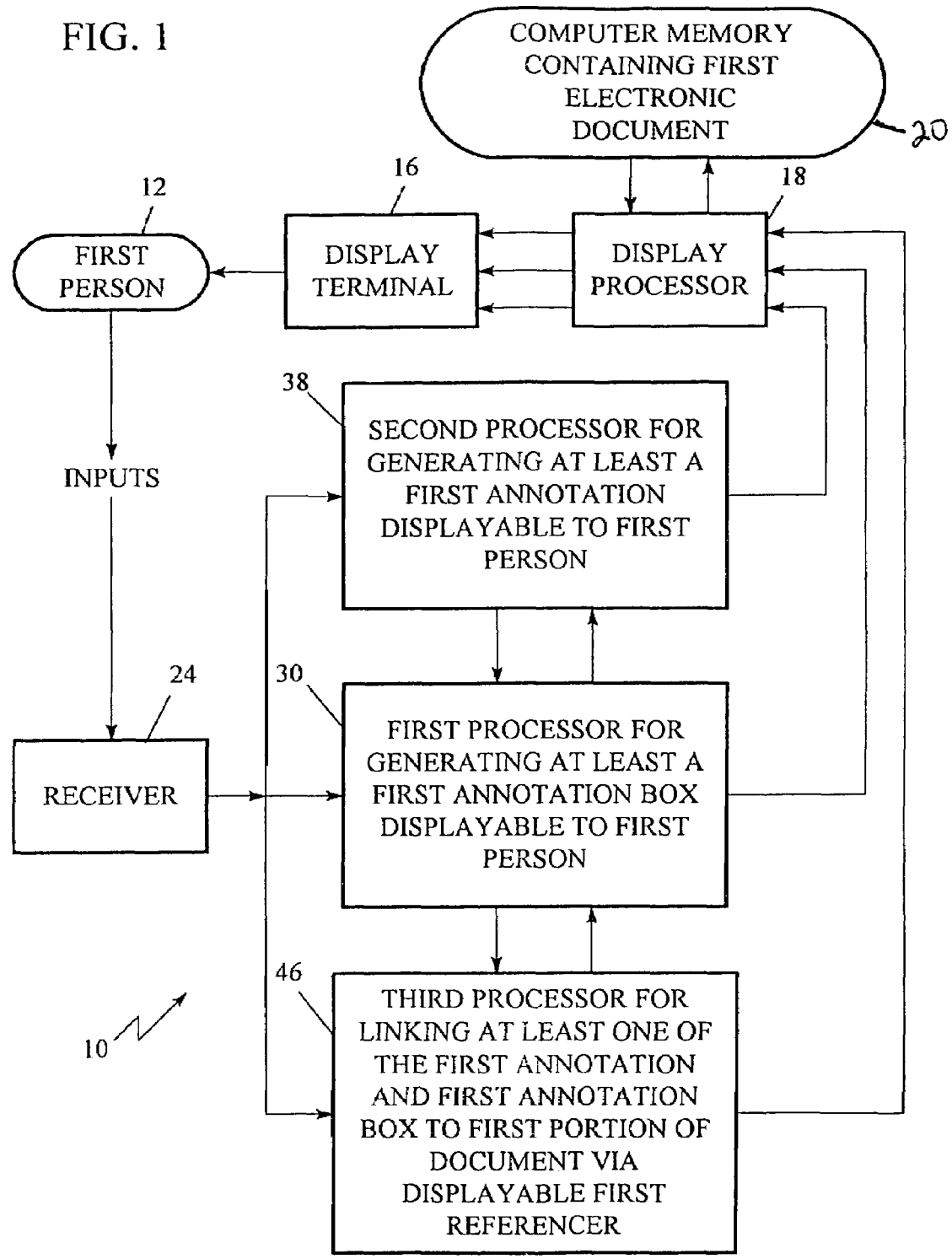
FIG. 1 is a diagrammatic illustration showing one embodiment of the system for annotating an electronic document according to the present invention.
Figure 2:
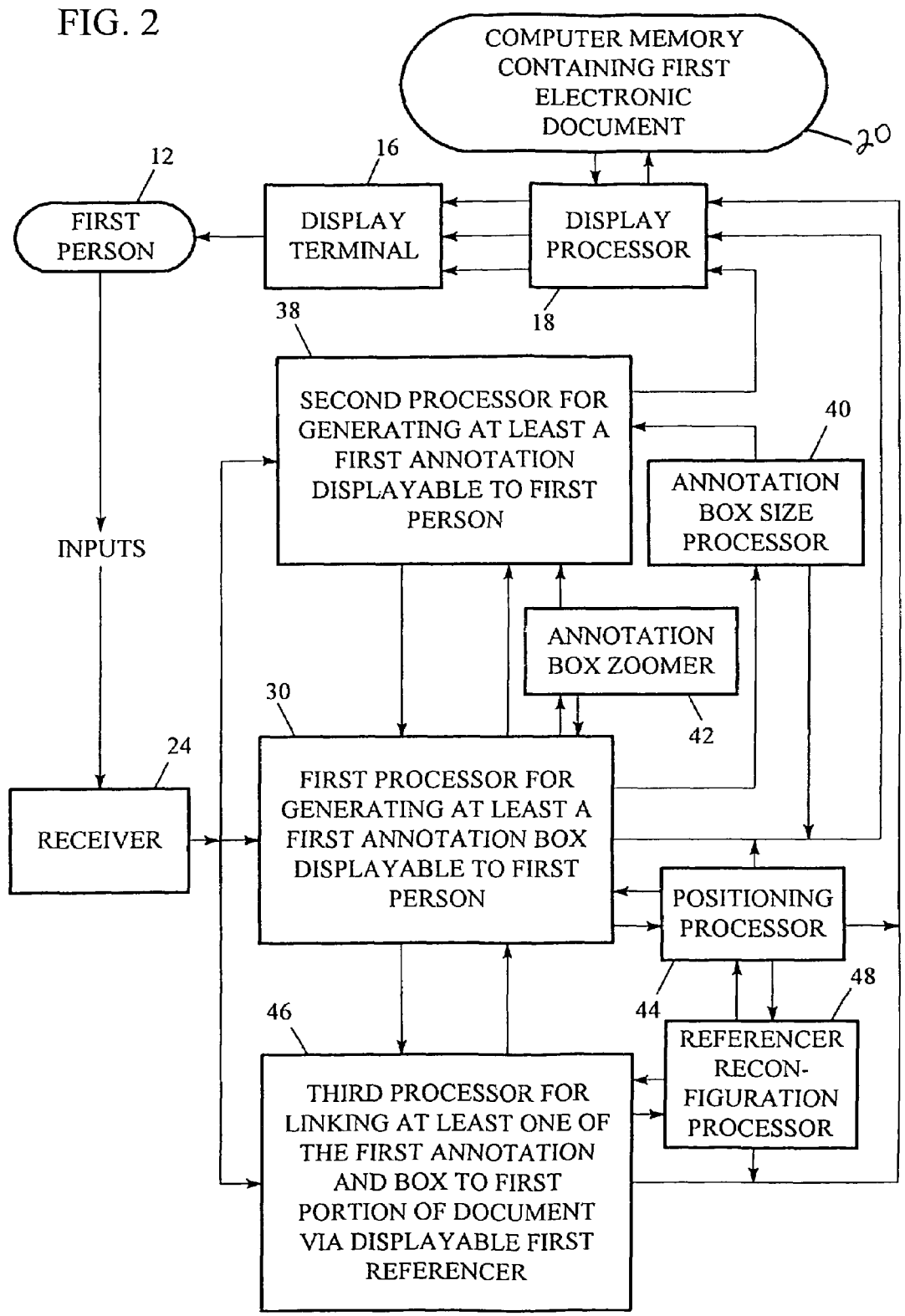
FIG. 2 is a diagrammatic illustration showing another embodiment of the system for annotating an electronic document according to the present invention.

More specifically, and as illustrated in FIG. 1, the system 10 for annotating may be used in conjunction with and/or implemented in a commercially available computer system having a display processor 18 for coordinating the display of appropriate items (e.g., document, annotation boxes, annotations), a display terminal 16 for displaying the electronic document to a first person 12 and one or more input devices, whereby a user, such as the first person 12, can direct the system 10 to perform certain tasks. In this regard, the system 10 includes a receiver 24 (e.g., server) for collecting inputs from the user or first person 12 and at least one processor for performing a number of tasks, in accordance with the inputs received and in accord with computer software programs of the present invention. The receiver 24 is capable of collecting inputs from various computer input devices, such as a computer mouse, a keyboard, touch-screen systems and/or voice systems, all of which are commercially available from various vendors.

Figure 3:
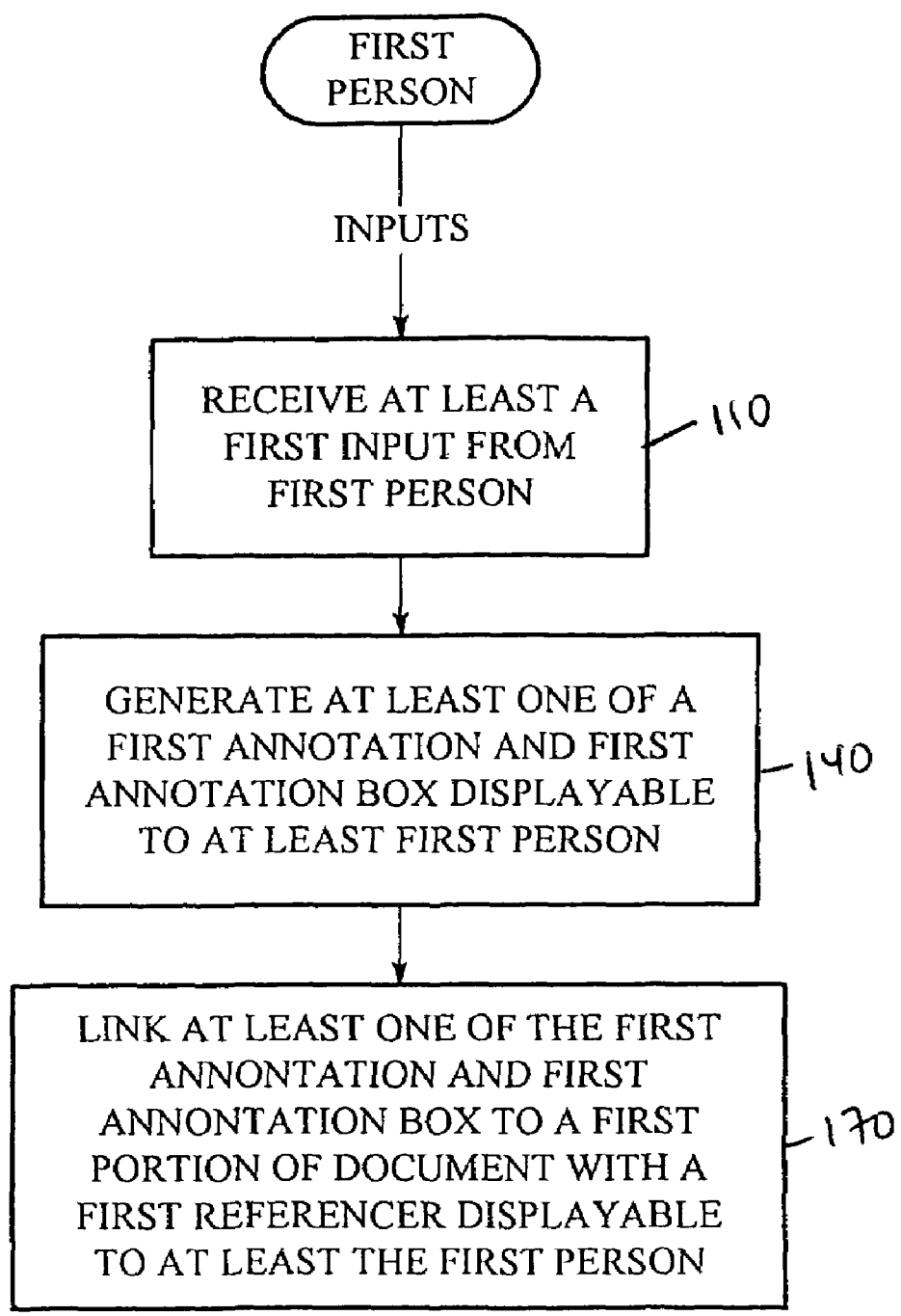
FIG. 3 presents a flow chart of one embodiment of the method for annotating an electronic document according to the present invention.
Figure 4B:
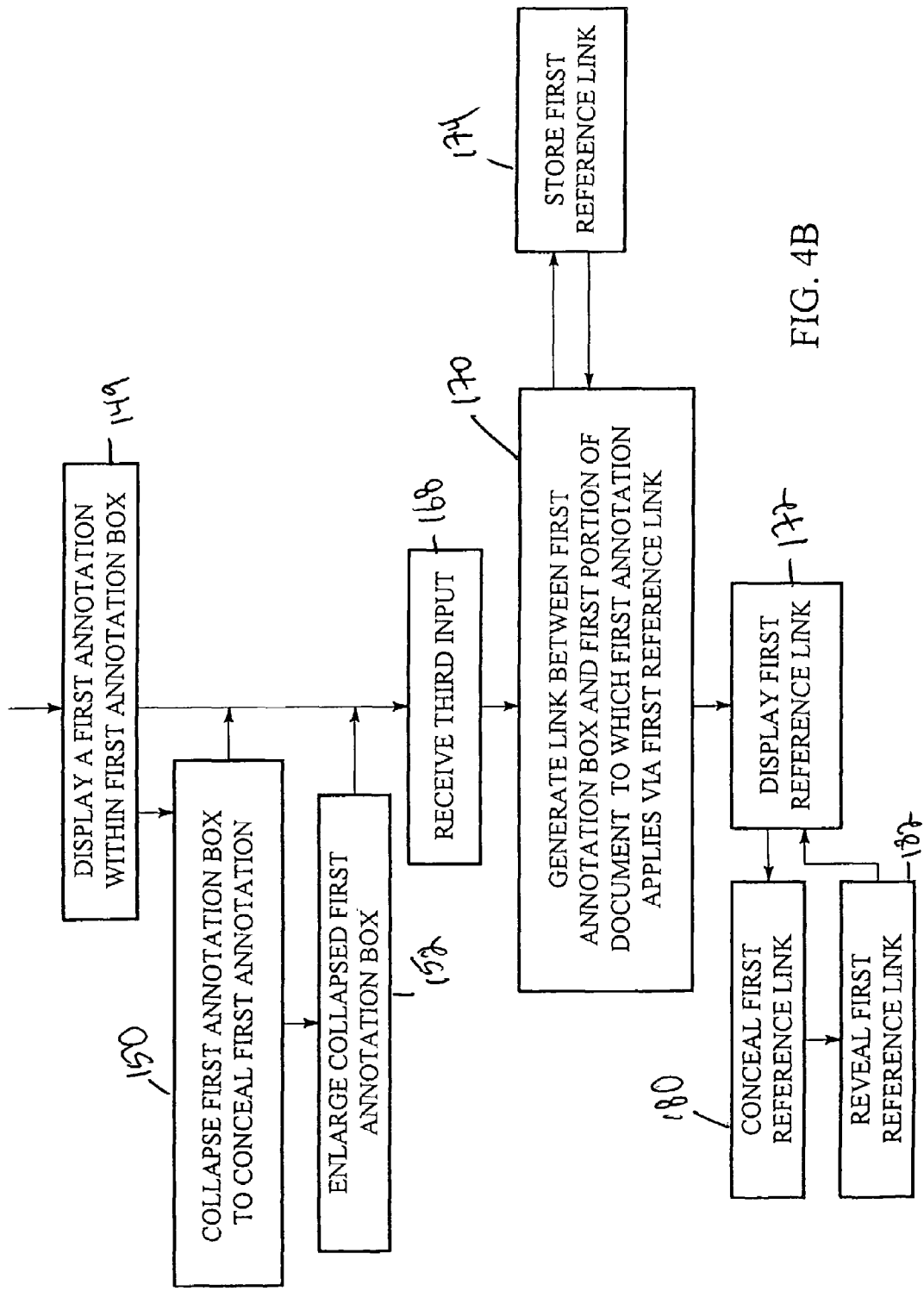

The method for annotating at least a first portion of an electronic document displayable to a first person via a display screen or terminal, illustrated in FIG. 3, generally includes the steps of receiving 110 at least a first input from the first person, generating 140, in response to the first input, at least one of a first annotation and a first annotation box displayable to the first person via the display screen, the first annotation being displayable within the first annotation box and concerning the first portion of the electronic document, and linking 170 at least one of the first annotation box and first annotation displayable therein with the first portion of the electronic document via a first reference link. As such, the method of the present invention facilitates annotation and review of an electronic document, especially in instances where a computer screen displaying a plurality of portions of the electronic documents have a plurality of annotations associated therewith.

As noted hereinabove, the method of the present invention, illustrated in FIGS. 4A-4B and 5A-5B, includes the steps of receiving 110 at least a first input from the first person, the input corresponding to forming a displayable annotation box, and generating 142 and displaying 144 such an annotation box via at least the display terminal 16. In this regard, the system 10 of the present invention, illustrated in FIGS. 1-2, includes a receiver 24, which is capable of collecting inputs or commands from the first person 12 concerning at least the creation or generation of at least a first displayable annotation. For example, in accordance with the method and system 10 of the present invention, the first person 12 viewing at least a first portion of an electronic document may select from an annotation tool palette (not shown) displayable to the first person 12, via the display terminal 16, a menu item for creating a displayable image of an annotation box or area, which "overlays" or "floats over" a second portion of the electronic document being annotated. As such, the system 10 includes a first processing means 30 which is capable of receiving inputs from the first person 12 via the receiver 24 and processing such inputs to generate a displayable annotation box 50, illustrated in FIG. 6, which overlays a second portion 56 of the electronic document 52.

Such a first processing means 30 is generally capable of processing inputs to generate such an annotation box 50 by various techniques implemented in a computer program encoded in a computer memory. For example, in one embodiment of the present invention, such a computer program may generally involve detecting whether a computer mouse down (e.g., actuated) is in the document, determining whether an annotation tool is selected, creating an annotation data structure, initializing such, and storing the initial bounds of the annotation. Further, for purposes of allowing the annotator to size the annotation box, the computer program may also involve initializing the previous mouse location, and, while the mouse is still down, getting the current mouse location and, where the current mouse location is different than the previous mouse location, sizing the annotation box by calculating the amount of horizontal and vertical deltas, getting the current bounds from the annotation data structure, adding the horizontal and vertical deltas to the current bounds, setting the current bounds in the annotation data structure, and drawing the new annotation box. Drawing the new annotation box may involve drawing the body of the annotation box, a drag bar, a link box, a zoom box and a sizer box, the functions of which will be described in more detail hereinbelow.

Figure 5A:
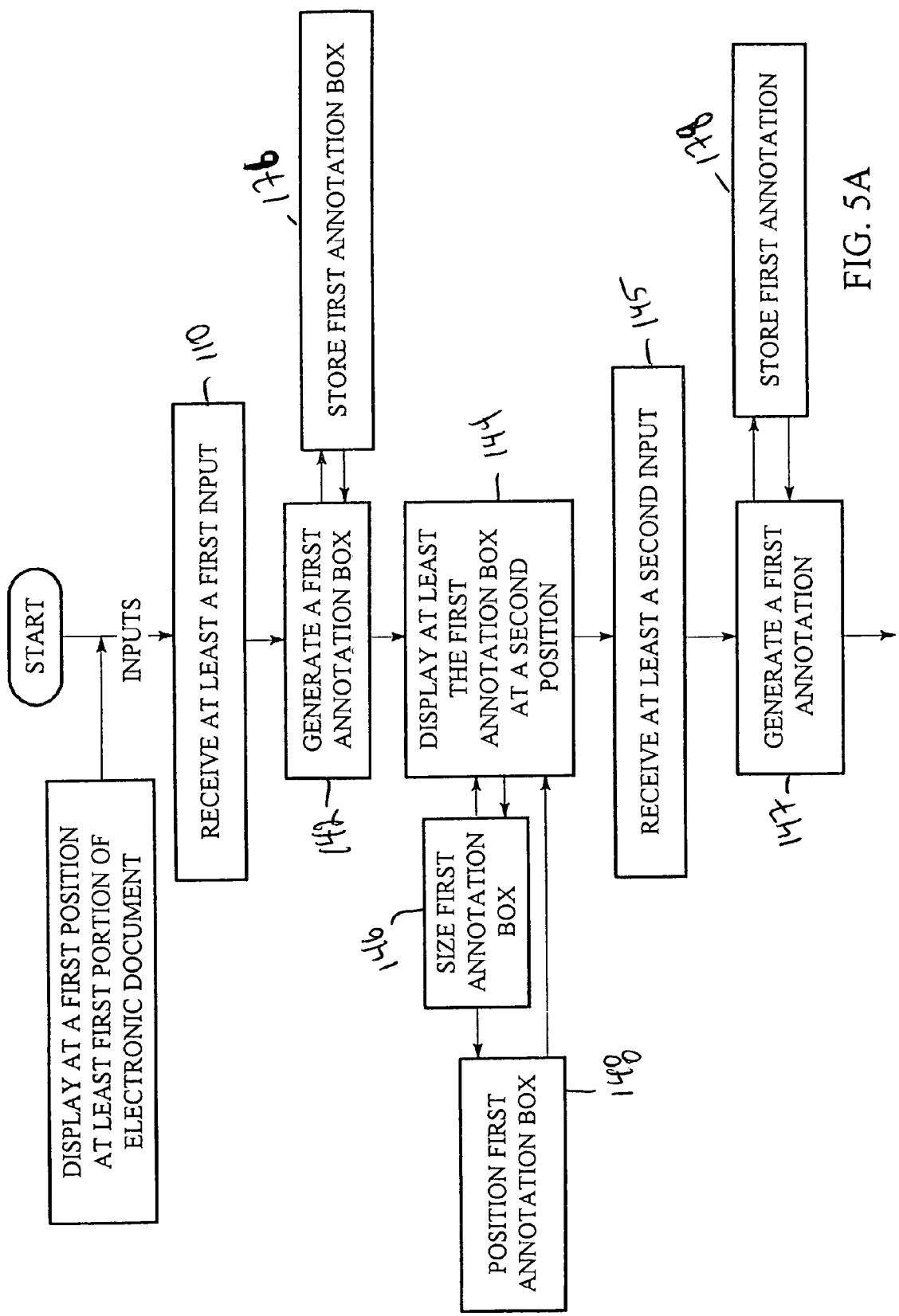
FIGS. 5A-5B present a flow chart of yet another embodiment of the method for annotating an electronic document according to the present invention.
Figure 5B:
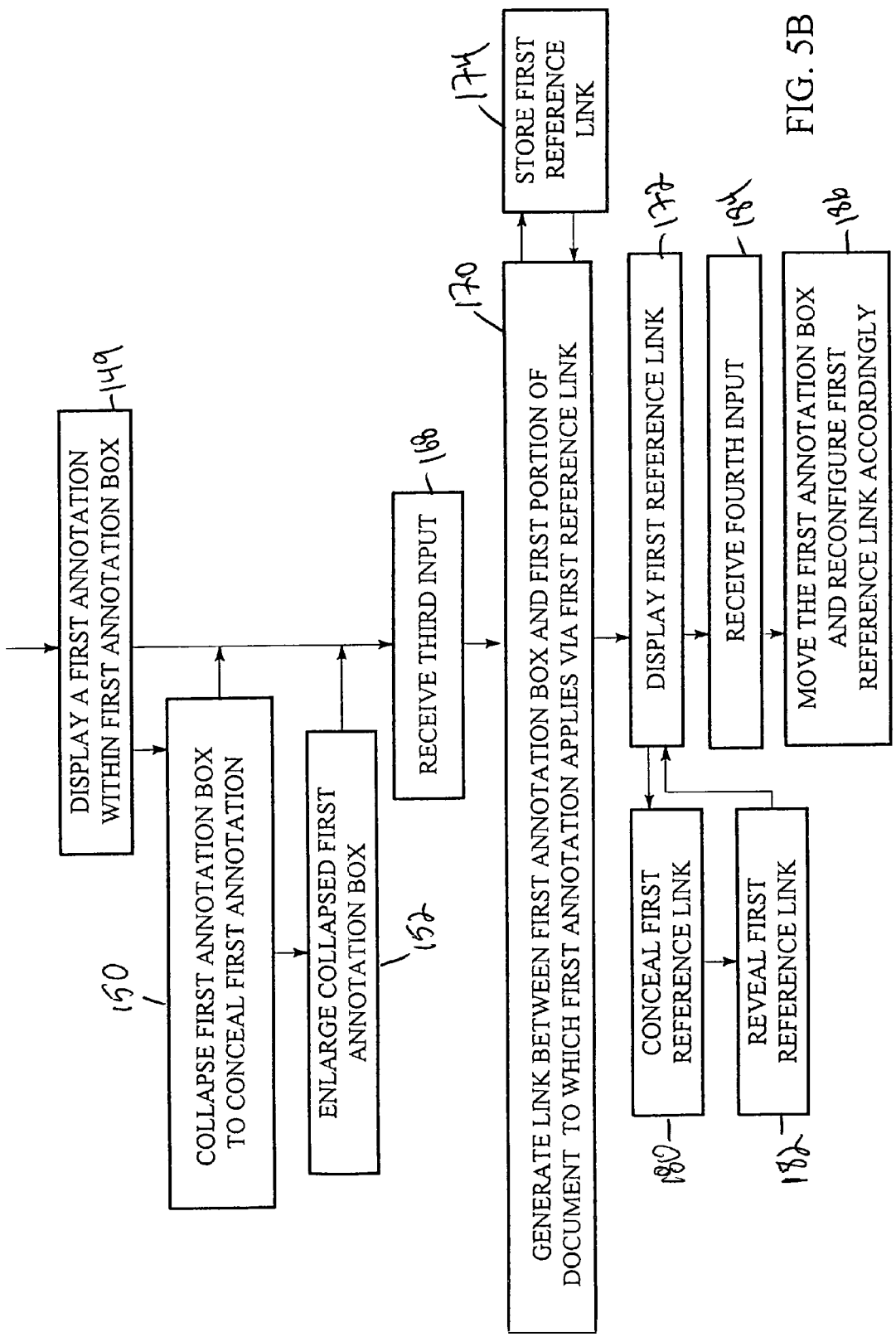
Figure 6:
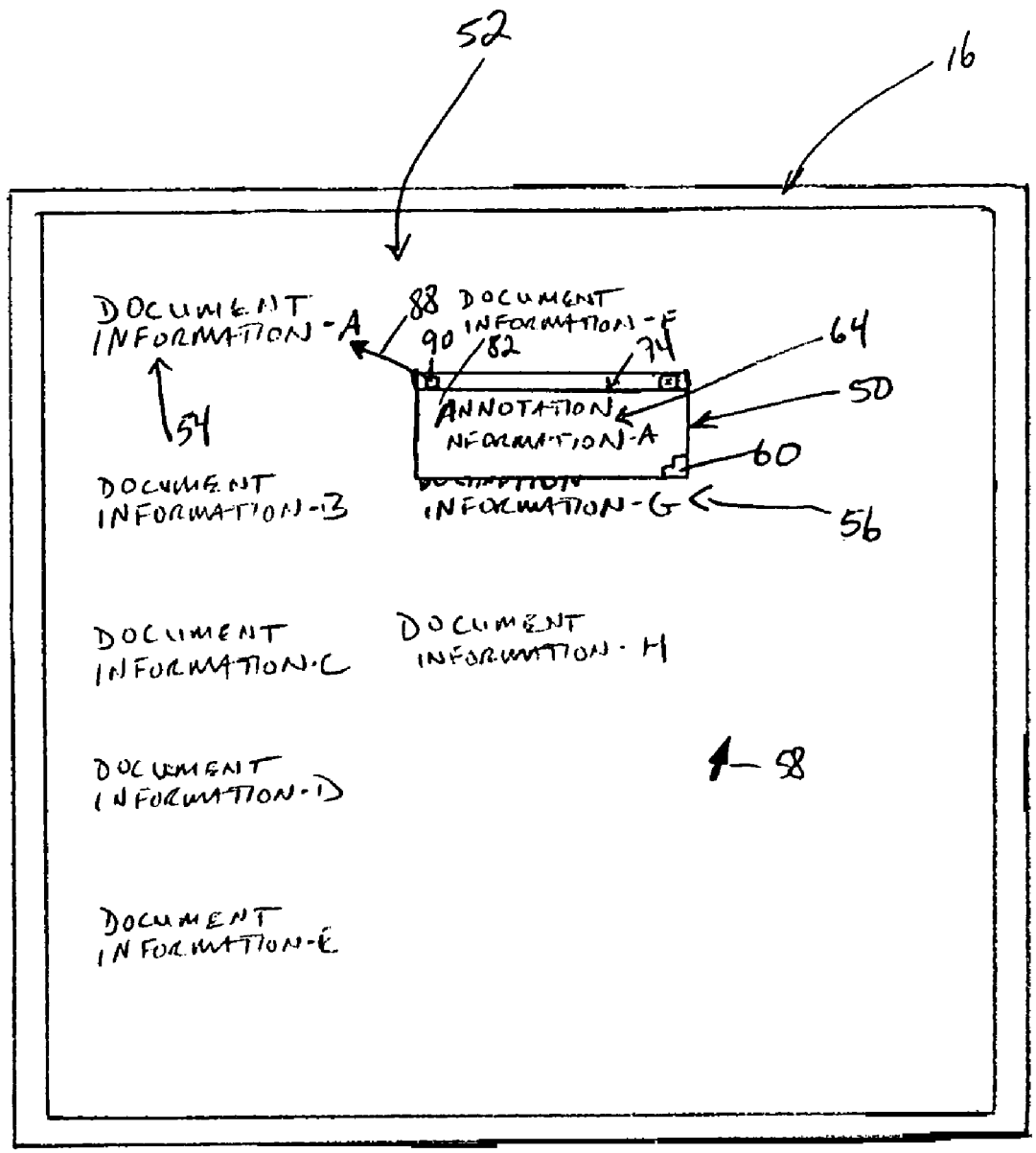
FIG. 6 illustrates a reference link extending between an annotation box having an annotation therein and a first portion of an electronic document, all of which are being displayed on a computer screen, according to the system and method of the present invention.
Figure 7A:
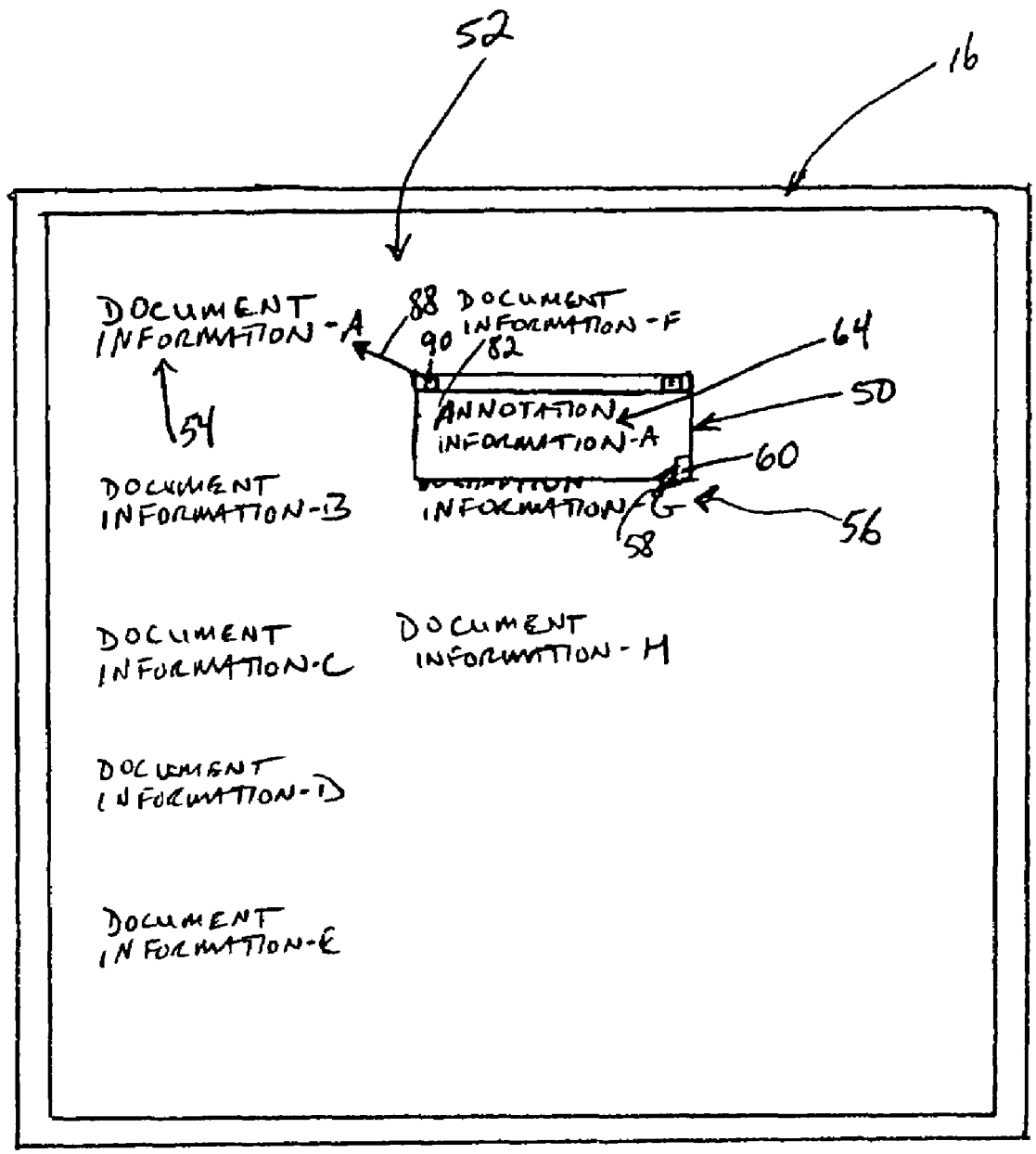
FIGS. 7A-7B illustrate progressive views of an annotation box being sized, relative to a first portion of an electronic document, according to the system and method of the present invention.
Figure 7B:
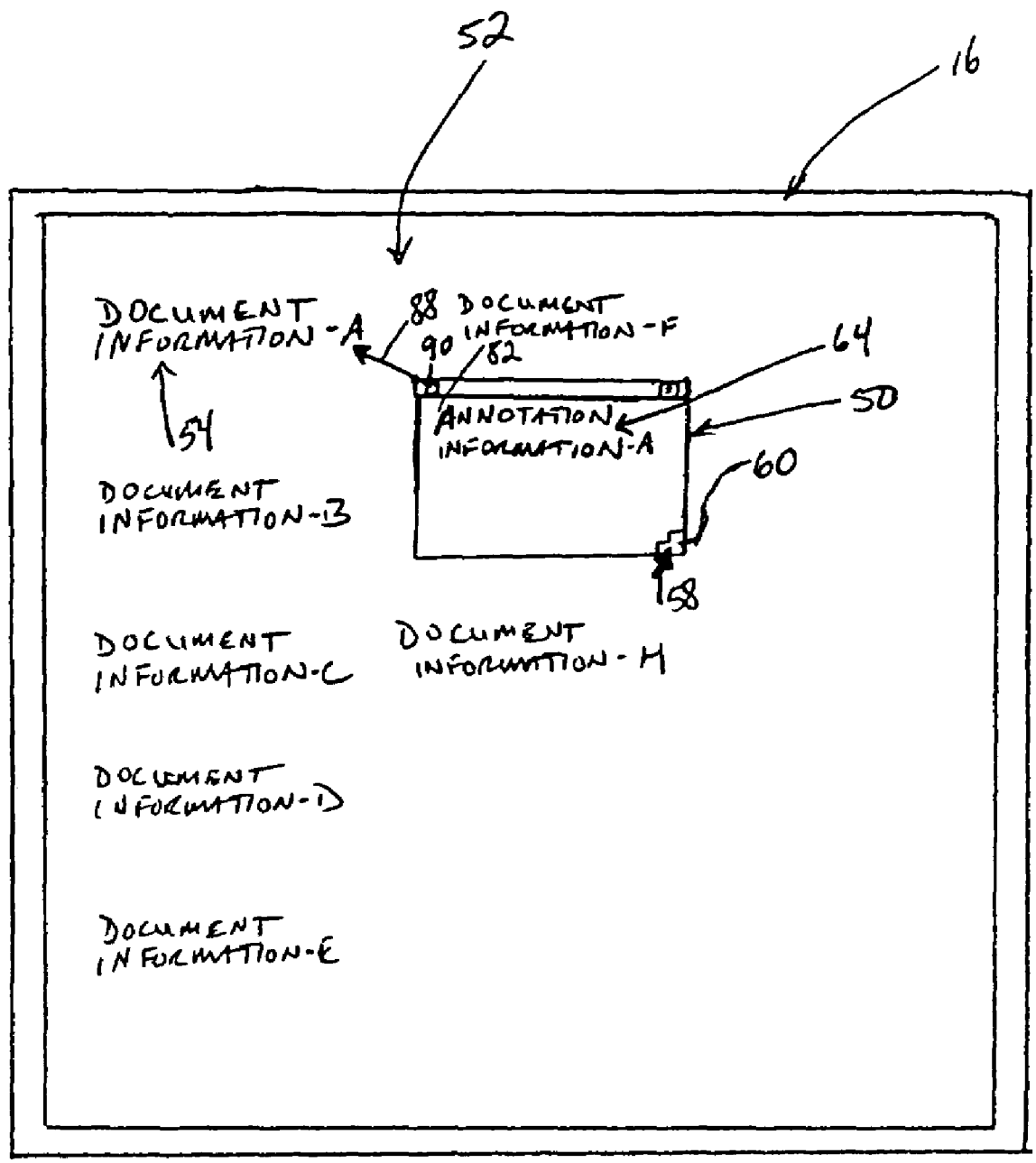

For purposes of providing an appropriately sized annotation box, the method of the present invention, illustrated in FIGS. 5A-5B, may also include the step of resizing 146 or reconfiguring the size of the annotation box 50, which is illustrated in FIG. 6. As such, in one embodiment, illustrated in FIG. 2, an annotation box size processing means 40, associated with the first processing means 30, is capable of processing an input from the first person 12 directed to reconfiguring the size of the annotation box 50. As described hereinabove, in order to create such an annotation box 50, illustrated in FIG. 6, an input device, such as a computer mouse and associated displayable cursor 58, may be used by the first person 12 to select an annotation option in the tool palette (e.g., via "clicking" or actuating a button of the computer mouse) to generate, via the first processor 30, an image on display terminal 16 of an annotation box. Substantially as shown in FIGS. 7A-7B, the first person 12 may then move cursor 58 via the computer mouse and "click" on a first region 60 (e.g., sizer box) of the annotation box 50 to command the annotation box size processing means 40 and the first processing means 30, upon receipt and processing of such inputs, to reconfigure or size the annotation box 50. For example, in order to enlarge the size of the annotation box 50, in one embodiment, illustrated in FIGS. 7A-7B, the inputs received from first person 12 include dragging the cursor 58 away from the first region 60 via the computer mouse. As such, the size of the annotation box 50 is varied by the annotation box size processing means 40 and the first processing means 30 in accordance with the distance the cursor 58 is moved relative to the first region 60 of the annotation box 50.

Such processing means 30, 40 for generating and sizing an annotation box 50 are generally implemented within the computer memory 20 of a computer system, the computer memory 20 being encoded with a computer program which generally involves detecting whether a mouse down (e.g., actuated) is in the annotation sizer box (e.g., first region 60), initializing the previous mouse location, and, while the mouse is still down, getting the current mouse location, and, if the current mouse location is different than the previous mouse location, calculating the amount of horizontal and vertical deltas, getting the current bounds from the annotation data structure, adding the horizontal and vertical deltas to the current bounds, setting current bounds in the annotation data structure and drawing the existing annotation box. Drawing the existing annotation box may include drawing the body of the annotation box, the drag bar, the link box, the zoom box and the sizer box.

According to the present invention, the first annotation box 50 and first annotation 64 displayable therein are positionable proximate the first portion 54 of the electronic document 52, such that the first annotation 64 and/or first annotation box 50 does not overlay or block out the first portion 54 of the electronic document 52 to which the first annotation 64 refers. As such, the first annotation box 50 and first annotation 64 displayable therein are positionable over the second portion 56 of the first electronic document 52, wherein the first and second portions 52, 54 of the electronic document 52 are displaced from each other, at different locations. In this regard, the method of the present invention, illustrated in FIGS. 5A-5B, may also include the steps of receiving an input from the first person 12 concerning moving at least the first annotation box 50 from a first location 68 to a second location 70, and positioning based on the input, the first annotation box 50 and first annotation 64 contained therein at the second location 70, such that the first annotation box 50 and first annotation 64 contained therein are displayable to the first person 12 and/or a viewer thereof proximate the first portion 54 of the electronic document 52. In order to position or move the first annotation box 50 and associated first annotation 64, a position processing means 44, illustrated in FIG. 2, cooperates with the first processing means 30 to process inputs from the first person 12 to determine the location to which the first person 12 desires to move the first annotation box 50.

Figure 8A:
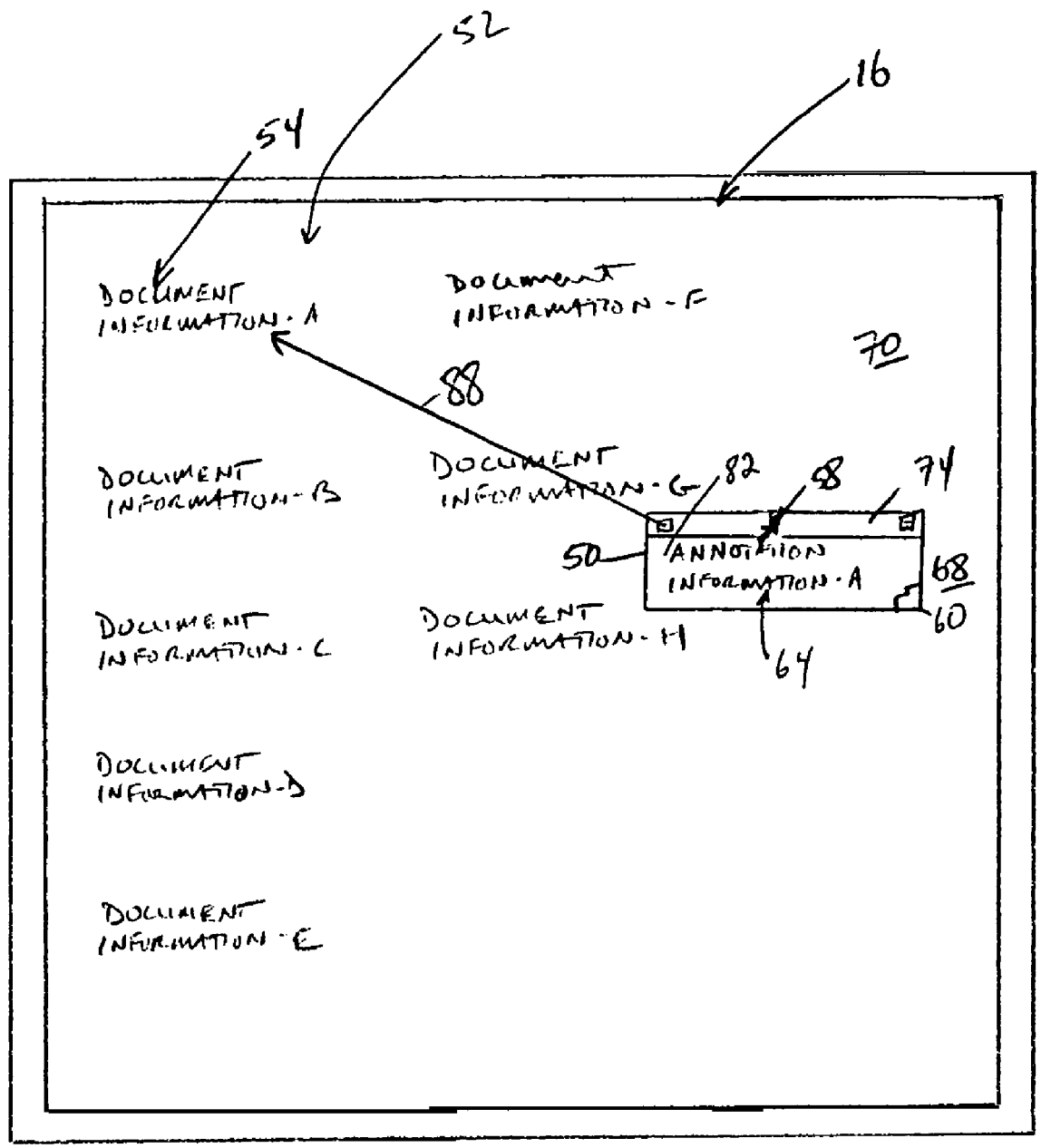
FIGS. 8A-8B illustrate progressive views of an annotation box being moved from a first location to a second location, relative to the first portion of the electronic document, and a reference link extending between the first annotation box and first portion of the electronic document being reconfigured accordingly, according to the system and method of the present invention.
Figure 8B:
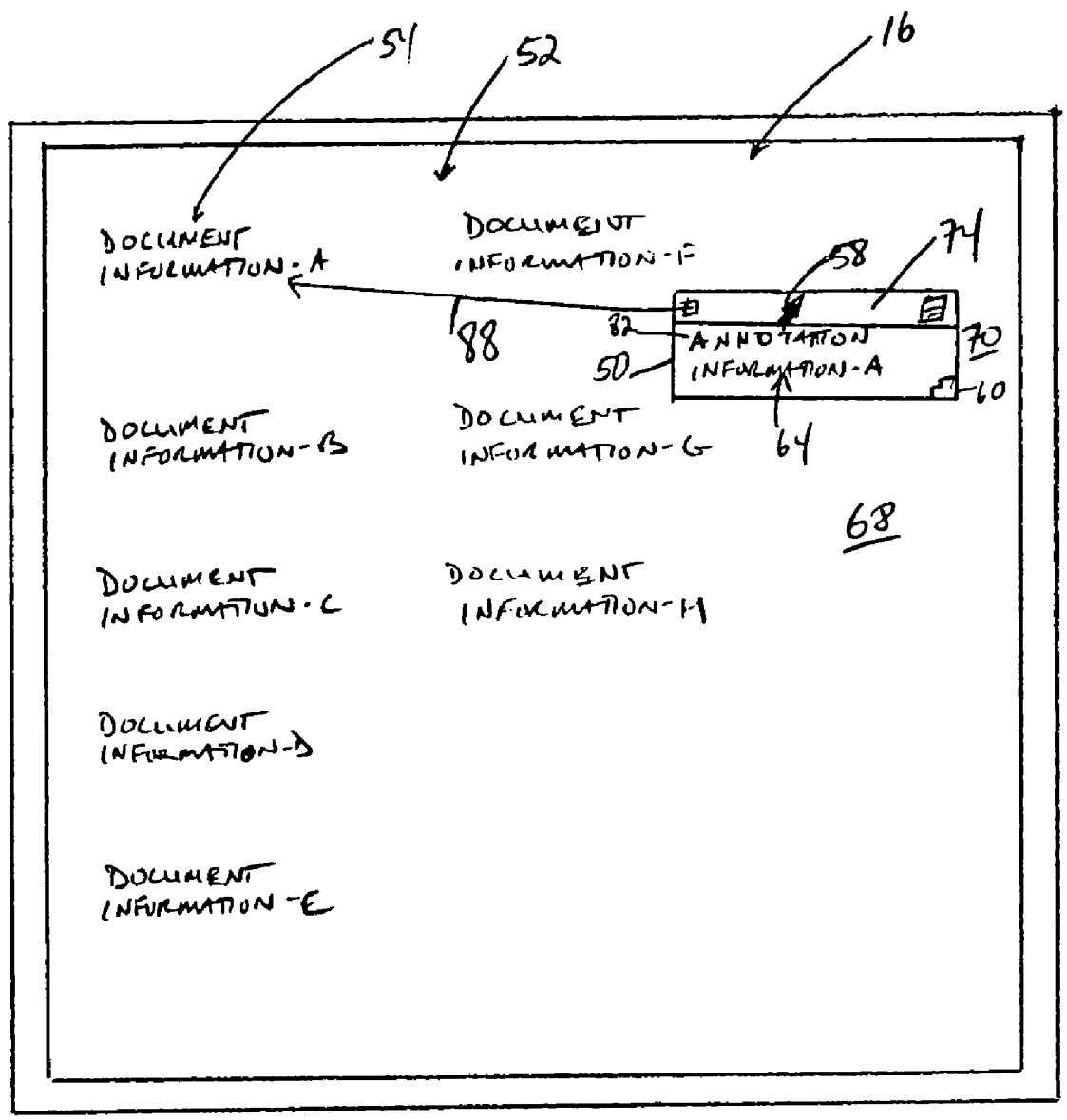

Further, the first and position processing means 30, 44 are capable of moving the image of the annotation box 50, and associated annotation 64 contained therein, from the first location 68 in the displayable electronic document 52, to the second location 70 in the displayable electronic document 52. In one embodiment, the first person 12 may input an appropriate instruction via the receiver 24 by utilizing a computer mouse and associated displayable cursor 58. More specifically, and as illustrated in FIGS. 8A-8B, the first person 12 may manipulate the position of the cursor 58 via the computer mouse to a second region 74 (e.g., drag bar) of the annotation box 50 and "click" on the second region 74 via the computer mouse to direct the first and position processing means 30, 44 to move or drag with the cursor 58, as manipulated by the first person 12 via the computer mouse, and the annotation box 50 from the first location 68 to the second location 70 in the electronic document 52. Such dragging of an annotation box from one location to another location may be implemented in a computer program encoded in a computer memory 20. Such a computer program generally involves detecting a mouse down (e.g., actuated) in the annotation drag bar (e.g., second region 74), initializing the previous mouse location, and, while the mouse is still down, getting the current mouse location, calculating the amount of horizontal and vertical deltas, getting the current bounds from the annotation data structure, offsetting the current bounds by the horizontal and vertical deltas, setting the current bounds in the annotation drag structure and drawing the annotation box after dragging. Such drawing may also include drawing the body of the annotation box, the drag bar, link box, zoom box, annotation text and sizer box.

Figure 9A:
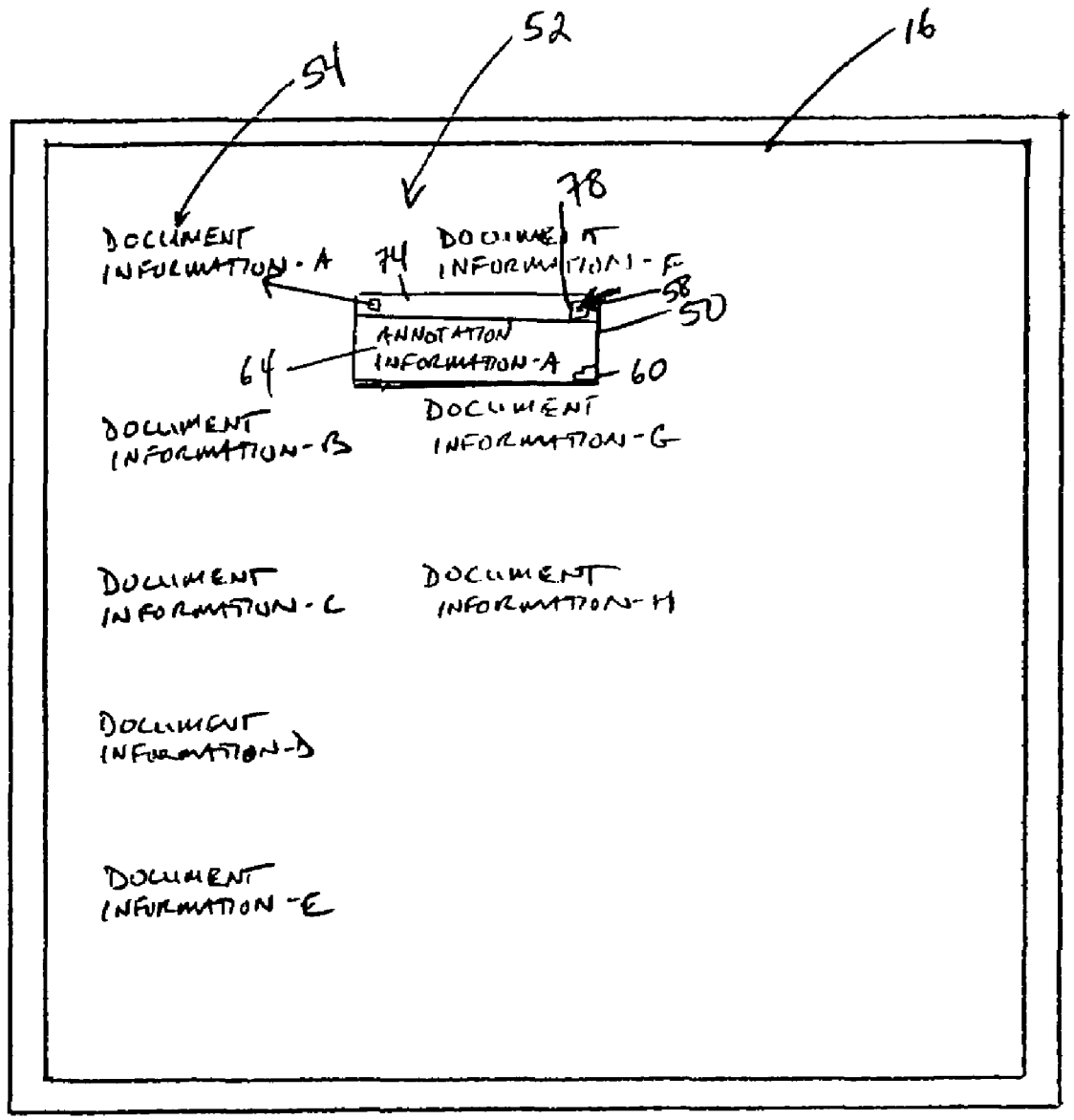
FIGS. 9A-9B illustrate progressive views of a first annotation box being collapsed, according to the system and method of the present invention.
Figure 9B:
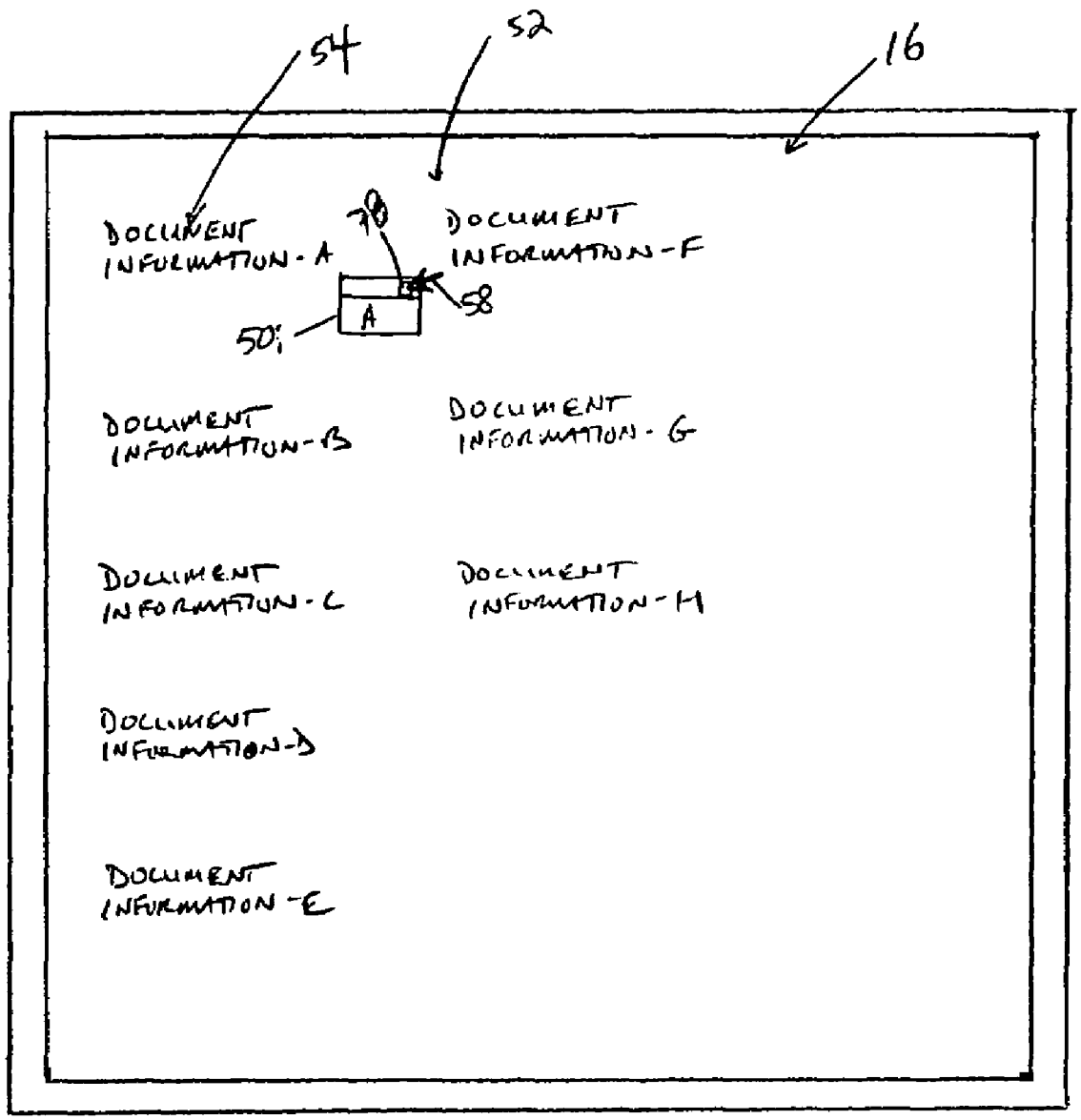

In another embodiment, for purposes of facilitating the annotation of an electronic document 52 by a first person 12 or the review of an annotated electronic document by a viewer, the method of the present invention includes the step of collapsing 150 the annotation box, as illustrated in FIGS. 9A-9B. In one embodiment, illustrated in FIG. 2, an annotation box zoom processing means 42 is capable of collapsing the first annotation box 50 from an enlarged state to a collapsed first annotation box $50_i$ such that none of the first annotation 64 associated therewith is displayed, and is capable of enlarging 152 the first collapsed annotation box $50_i$ from a collapsed state to an enlarged state, such that at least part of the first annotation 64 is displayed. As such, the annotation box zoom processing means 42 may generate a displayable image of a collapsed annotation box $50_i$ having the letter "A" contained therein to denote to the first person 12 and/or the viewer of the annotated electronic document that the box $50_i$ is an enlargeable annotation box which possibly contains a displayable annotation 64 therein, substantially as illustrated in FIGS. 9A-9B. In order to collapse such an annotation box, the annotation box zoom processing means 42 is capable of receiving and processing inputs from the first person 12 and/or the viewer of the electronic document, via the receiver 24. In one embodiment, a computer mouse and associated displayable cursor 58 are used by the first person 12 to supply to the annotation box zoom processing means 42 such inputs concerning collapsing an annotation box. For example, after generation of a first annotation box 50 via the first processing means 30, and generation of an annotation 64 therein via a second processing means 38 (to be described in more detail hereinbelow), a first person 12 may move the cursor 58, via the computer mouse, to a third region 78 (e.g., zoom box) of the annotation box 50 and "click" on the third region 78 to collapse the annotation box 50 into a collapsed annotation box 50$_c$, such that the area of the annotation box is reduced and at least a portion of the annotation 64 is concealed, as illustrated in FIGS. 9A-9B.

The annotation box zoom processing means 42 may be implemented in a computer program encoded in a computer memory 20 within the system 10. Such a computer program for collapsing and/or enlarging an annotation box involves detecting a mouse down (e.g., actuated) is in the annotation zoom box (e.g., third region 78) and, if the annotation box is collapsed, inflating the annotation box by getting the original bounds from the annotation data structure (i.e., alternate bounds), getting the collapsed bounds from the annotation data structure (i.e., current bounds), determining a horizontal delta from the collapsed and original left bounds, determining a vertical delta from the collapsed and original top bounds, offsetting the original bounds by the horizontal and vertical deltas (e.g., in instances where the collapsed annotation box was moved), setting the original bounds in the annotation data structure, setting a variable (e.g., collapsed flag) to false in the annotation data structure and drawing enlarged annotation box. Such drawing of the enlarged annotation box may include drawing the body of the annotation box, the drag bar, the link box, the zoom box, the annotation text and the sizer box. In instances where the annotation box is to be collapsed from an enlarged state, the computer program may involve getting the original bounds from the annotation data structure (i.e., current bounds), setting the original bounds in the annotation data structure (i.e., alternate bounds), setting a variable (e.g., collapsed flag) to true in the annotation data structure, setting collapsed bounds in the annotation data structure (e.g., collapsed bounds is a constant width and height whose top left point equals the top left point of the original bounds), and drawing the collapsed annotation box. Such drawing of the collapsed annotation box may be accomplished by drawing the body of the collapsed annotation box, the drag bar, the zoom bar and the letter "A".

Figure 10A:
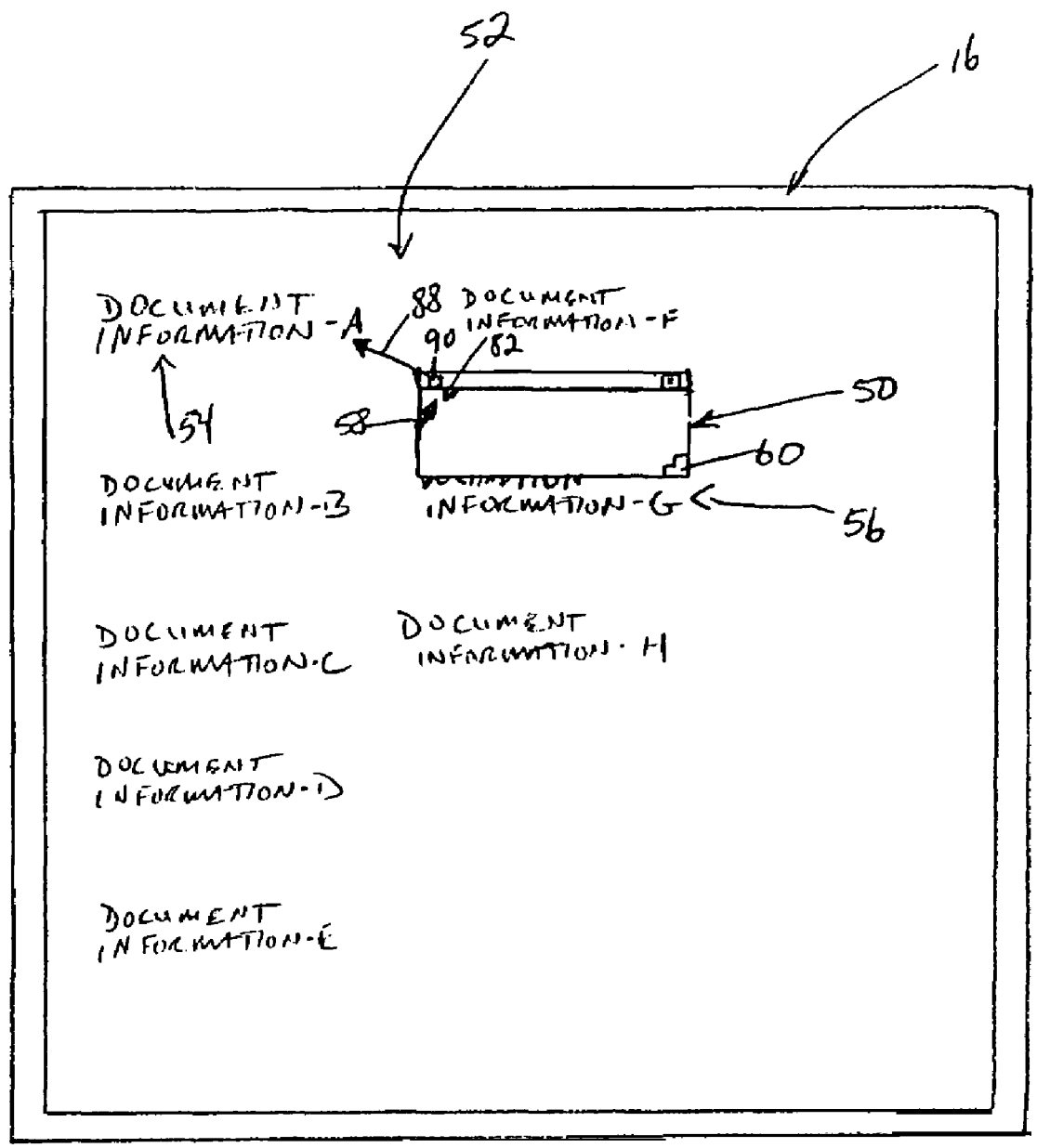
FIGS. 10A-10B illustrate progressive views of a first annotation being generated within the interior area of a first annotation box, according to the system and method of the present invention.
Figure 10B:
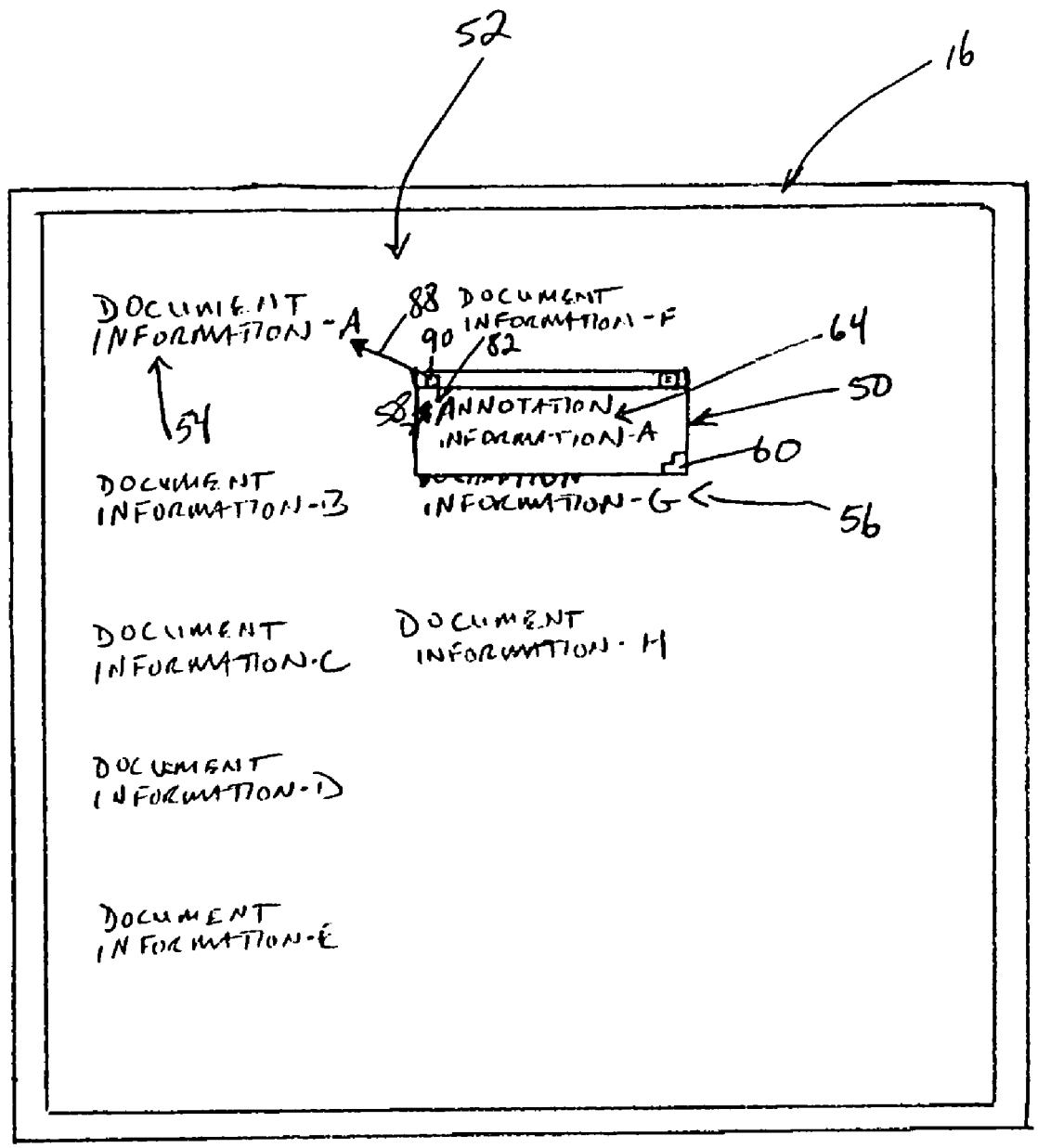

For purposes of providing a displayable annotation within the borders of an annotation box, the method of the present invention includes the steps of receiving 145 at least a second input corresponding to text of such a first annotation concerning the first portion of the electronic document, and generating 147 a displayable first annotation from the second input, wherein the first annotation is displayable within the first annotation box. For purposes of facilitating annotation and/or review of the electronic document, the method may also include the step of displaying 149 at least the first annotation 64 within the first annotation box 50, as illustrated in FIGS. 4A-4B and 5A-5B. In order to create such annotations, the system 10 of the present invention also includes, in one embodiment of the invention illustrated in FIGS. 1-2, a second processing means 38 for receiving a plurality of inputs from the first person 12 corresponding to a first annotation 64. More specifically, the second processing means 38 is capable of collecting, via the receiver 24, and processing a plurality of inputs from the first person 12 to generate a displayable image of the text of the first annotation 64, the first annotation 64 being relevant to a first portion 54 of the electronic document 52. In one embodiment of the present invention, after providing an appropriate input(s) to generate an image of a first annotation box 50, substantially as described hereinabove, the first person 12 may utilize a computer mouse and associated displayable cursor 58 to begin generating a first annotation 64 within the borders of a corresponding first annotation box 50. In particular, and substantially as illustrated in FIGS. 10A-10B, the first person 12 may manipulate the cursor 58, via the computer mouse, to a fourth region 82 (e.g., text editing area) of the annotation box 50 to input or enter the first annotation 64 therein via another input device (e.g., keyboard, voice recognition system). The second processing means 38 collects and processes such inputs from the first person 12 to generate an image of the text of the annotation 64 within the fourth region 82 of the annotation box 50.

In one embodiment, the second processing means 38 is a computer program encoded in a computer memory 20. Such a computer program may generally involve detecting a key press (e.g., from a keyboard), getting the key press and, if the annotation is visible and not collapsed, and is selected, getting a link to the annotation text record from the annotation data structure, setting the key press in text record and drawing the text of the annotation, in accord with the keypress(es). If this is the first time entering text, the computer program may also involve setting up text style and size. Further, the computer program may perform the appropriate key function for special keys (e.g., delete, home, end, left arrow).

In order to facilitate the annotation of such electronic documents, and in particular, the review of such annotations by a reviewer (e.g., for purposes of editing the electronic document in accordance with the annotations), the method and system of the present invention contemplate relating or linking such annotations with the specific portions of the electronic document to which such annotations refer. In this regard, the method of the present invention includes the step of linking 170, via a first displayable link or referencer 88, illustrated in FIGS. 3, 4A-4B and 5A-5B, at least a first annotation box 50 and/or first annotation 64 contained therein to a first portion 54 of the electronic document 52. Such linking may be accomplished by utilizing a third processing means 46, illustrated in FIGS. 1-2, which is capable of receiving 168 and processing, in accordance with a computer software program of the present invention, at least one input from a first person 12, via the receiver 24, to generate or form such a displayable electronic link or referencer 88 which extends between the first annotation box 50 and the first portion 54 of an electronic document 52 to which the first annotation 64 relates. As such, the method illustrated in FIGS. 4A-4B and FIGS. 5A-5B further include the step of displaying 172 the first reference link.

Figure 11A:
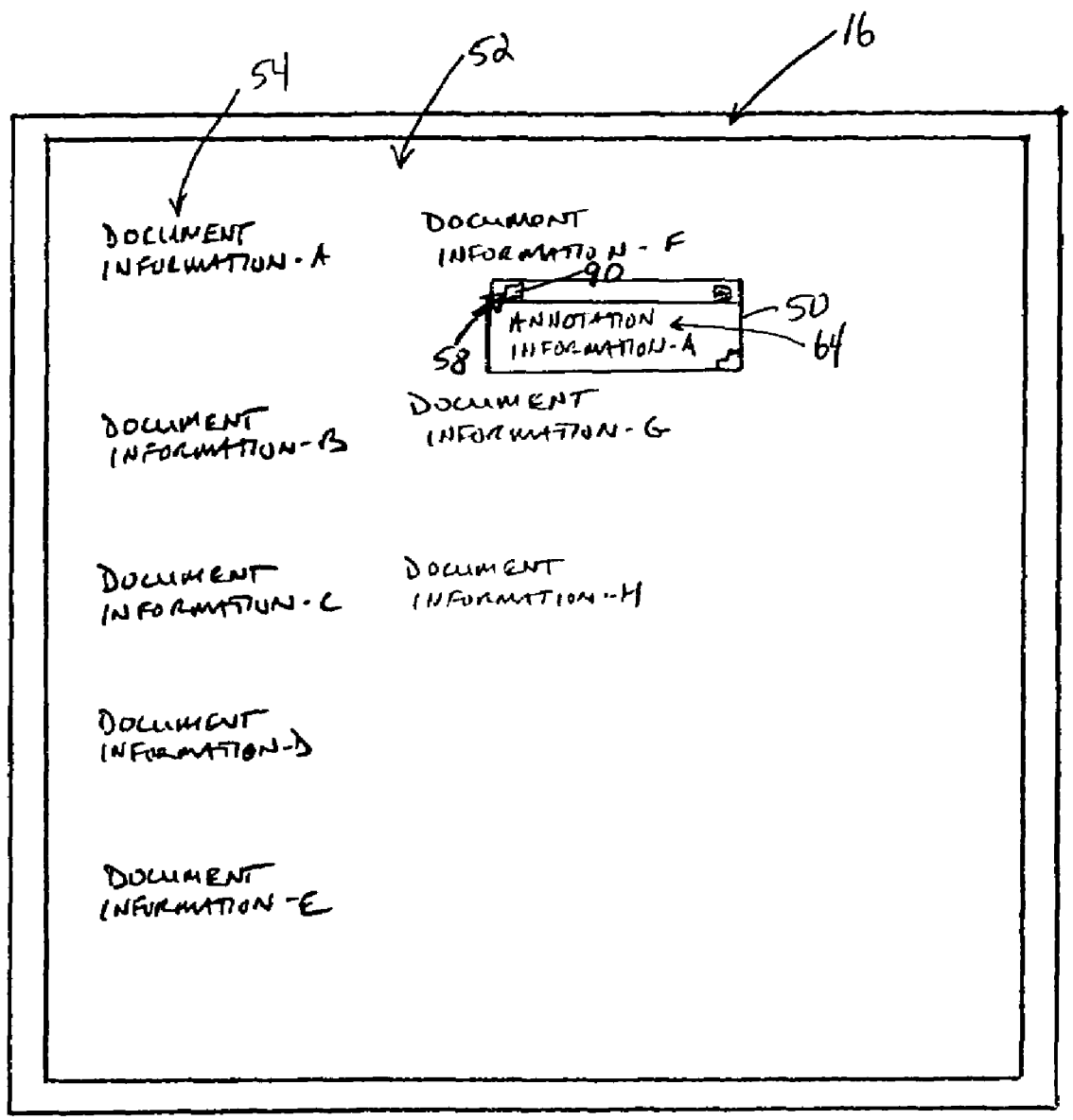
FIGS. 11A-11C illustrate progressive views of a first reference link between a first annotation box and a first portion of the electronic document being generated, according to the system and method of the present invention.
Figure 11B:
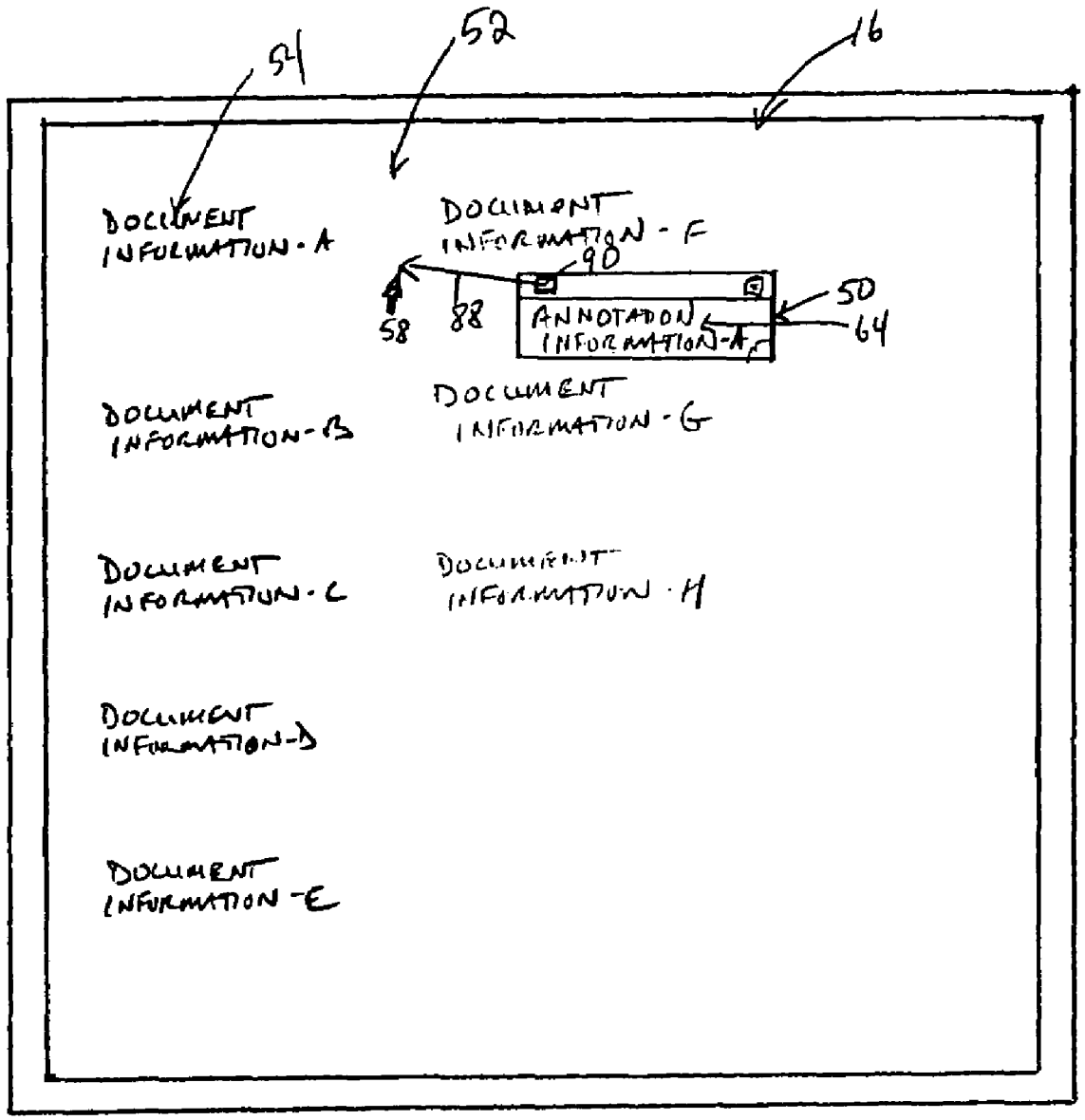
Figure 11C:
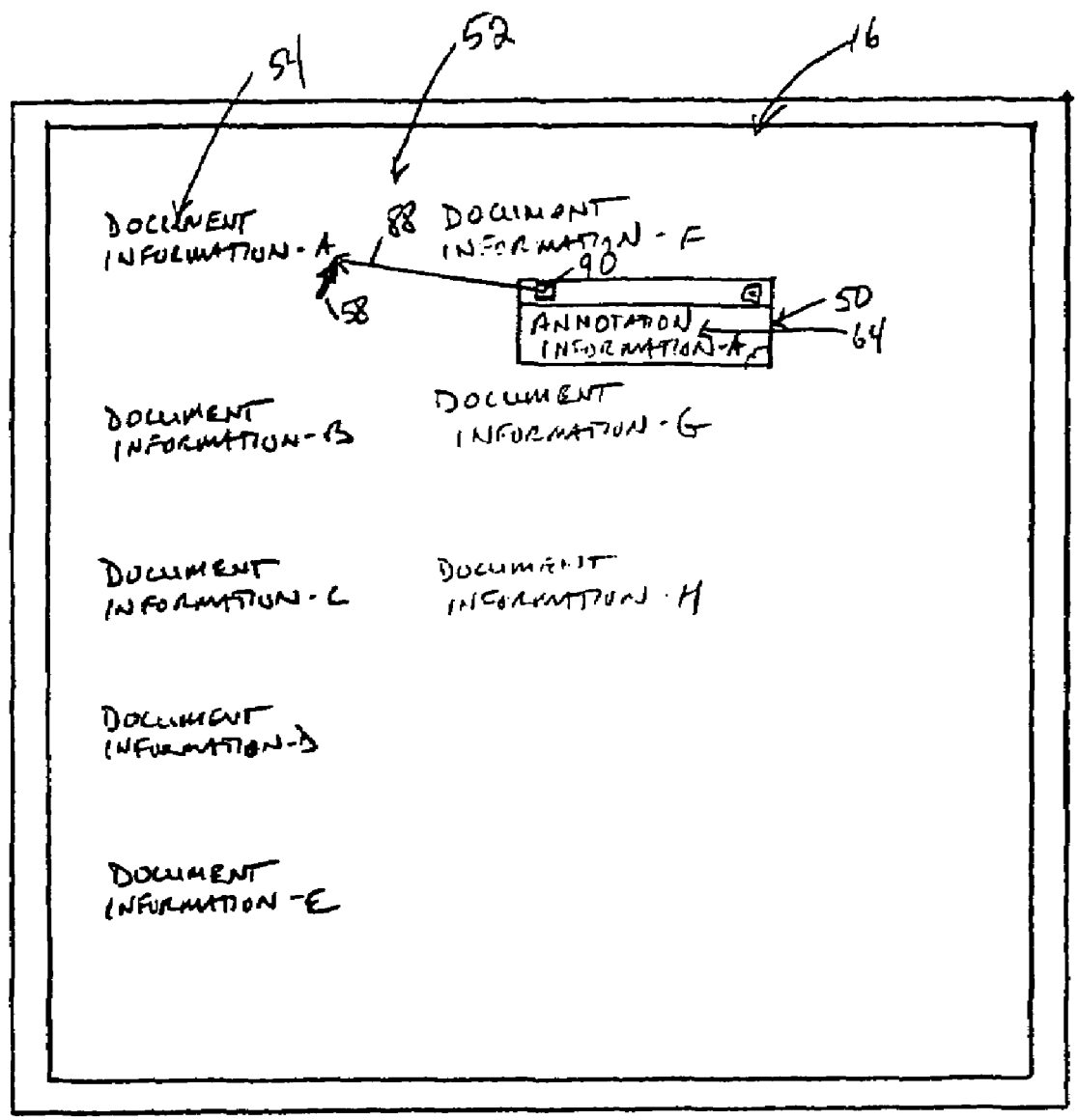

In order to generate such a link, a first person 12 may provide at least one input to establish such a displayable link 88 by utilizing an appropriate input device, such as a computer mouse and associated displayable cursor 58, is processed by the third processing means 46 via the receiver 24. In one embodiment, where a first person 12 wishes to create a displayable link 88 between a first portion 54 of the electronic document 52, located at a first position, and the first annotation box 50, located at a second position, the first person 12 may manipulate the computer mouse to move the displayable cursor 58 to a fifth region 90 (e.g., link box of the first annotation box 50), and "click" on the fifth region 90 of the annotation box 50, illustrated in FIGS. 11A-11C. Such actuation of the mouse when the cursor 58 overlays the fifth region 90 is received and processed by the system 10 to generate, via the third processing means 46, at least a first end (e.g., tail) of the displayable link 88. Subsequently, a second link input may be received and processed by the third processing means 46 to create or establish a line forming the interior of the reference link 88. Such a second link input may correspond to the first person 12 causing, via the mouse, the cursor to drag or move away from the fifth region 90 of the first annotation box 50 and toward the first portion 54 of the electronic document 52, as shown in FIGS. 11A-11C. Finally, a third link input may be received and processed by the third processing means 46 to establish or generate a second end (e.g., in the form of an arrow head, or end of a line) of the reference link 88, the second end being associated with the first portion 54 of the electronic document 52. Such a third link input may be manifested by the first person 12 letting up on (e.g., deactuating) the mouse. The third processing means 46 is thus capable of receiving or collecting, via the receiver 24, and processing such inputs, in accordance with a computer software program of the present invention, to generate a reference link, the length of which is determined in accordance with the inputs received from the first person 12. As such, the third processor 46, upon receipt of the inputs from the first person 12 corresponding to the first referencer, determines the positions of the ends of the first referencer, relative to the portion of the first electronic document being displayed via the display terminal 16, in order to generate 170 and display 172 an image of the first referencer. In this regard, the system and method of the present invention provide for the generation of a referencer link that extends between the first annotation box and the first portion of the electronic document to which the first annotation relates.

For purposes of generating or creating such a reference link, third processing means 46 includes a computer program encoded in a computer memory. Such a computer program involves drawing an outline of an arrow by detecting a mouse down in the annotation link box (e.g., fifth region 90), initializing points of the arrow having an anchor point equal to the mouse down location, initializing a previous mouse location, getting the current mouse location, and, while the mouse is still down, getting the current mouse location, detecting whether the mouse has changed location, setting the final mouse location in the annotation data structure, setting a visibility flag (e.g., a variable) in the annotation data structure to true, creating the actual reference link and drawing the reference link (e.g., arrow). Creating the actual reference link in the shape of an arrow, for example, generally involves storing the arrow by using the final arrow location from the annotation data structure and a point within the link box (e.g., fifth region 90) to create a structure or region in the shape of an arrow and storing the structure in the annotation data structure. Drawing the arrow (i.e., reference link) may involve drawing the body of the annotation box, the drag bar, the link box, the zoom box, the annotation text and, if the annotation arrow region or structure exists and is visible, drawing the arrow region, and drawing the sizer box.

In another embodiment, for purposes of providing a record of reference links that are selectively retrievable by the first person 12 or viewer of an annotated electronic document, the method of the present invention includes the step of storing 174, 176, 178 the reference links between annotations and respective portions of the electronic document within a database or memory, as well as the annotation boxes and annotations associated therewith. As such, an internal reference link between each annotation and respective portion of the electronic document may be established. Storing the reference links may be conducted by the computer program described herein for creating the structure or region in the shape of the arrow and setting the region in the annotation data structure.

Figure 12A:
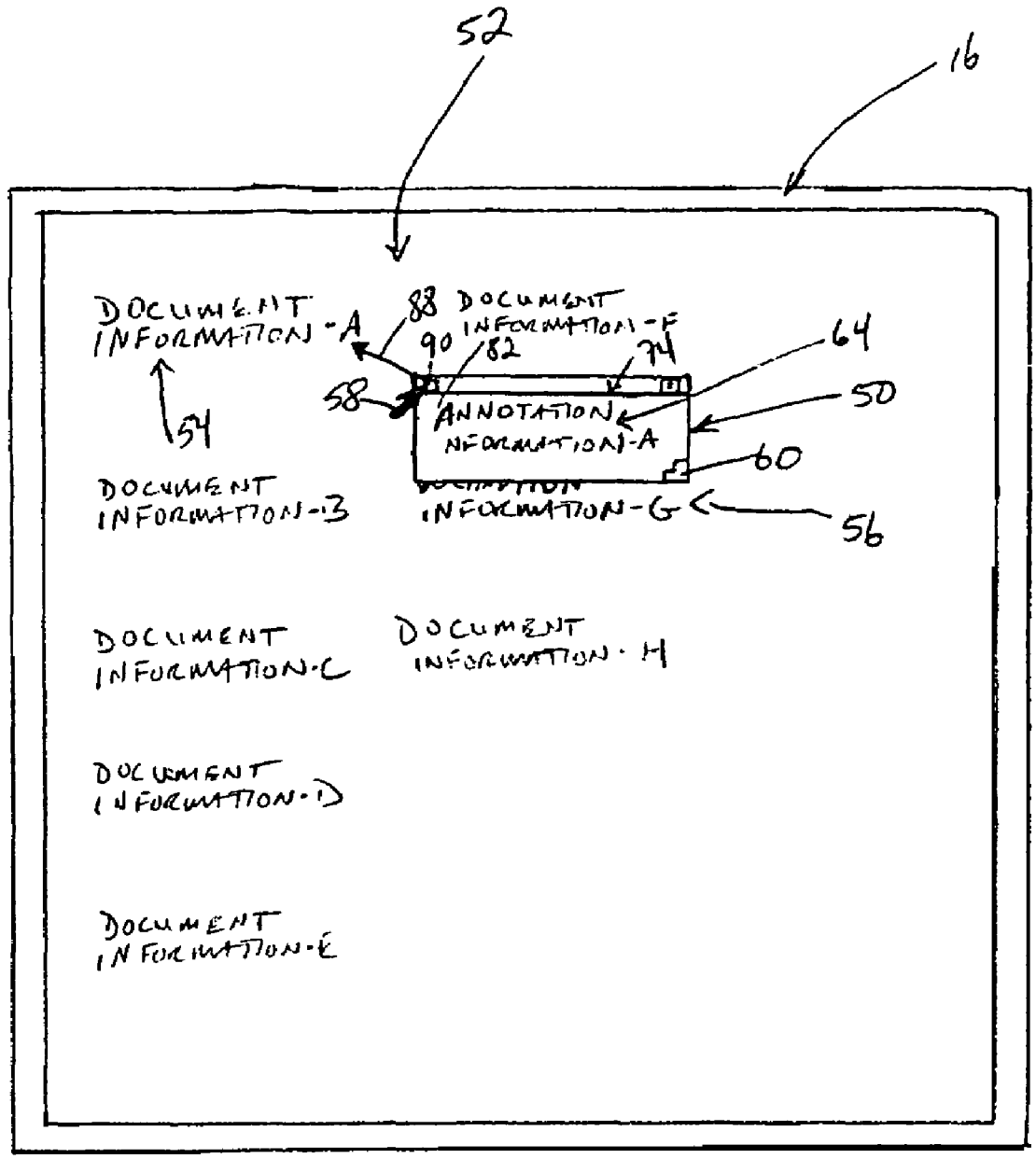
FIGS. 12A-12B illustrate progressive views of a first reference link between a first annotation box and a first portion of the electronic document being concealed, according to the system and method of the present invention.
Figure 12B:
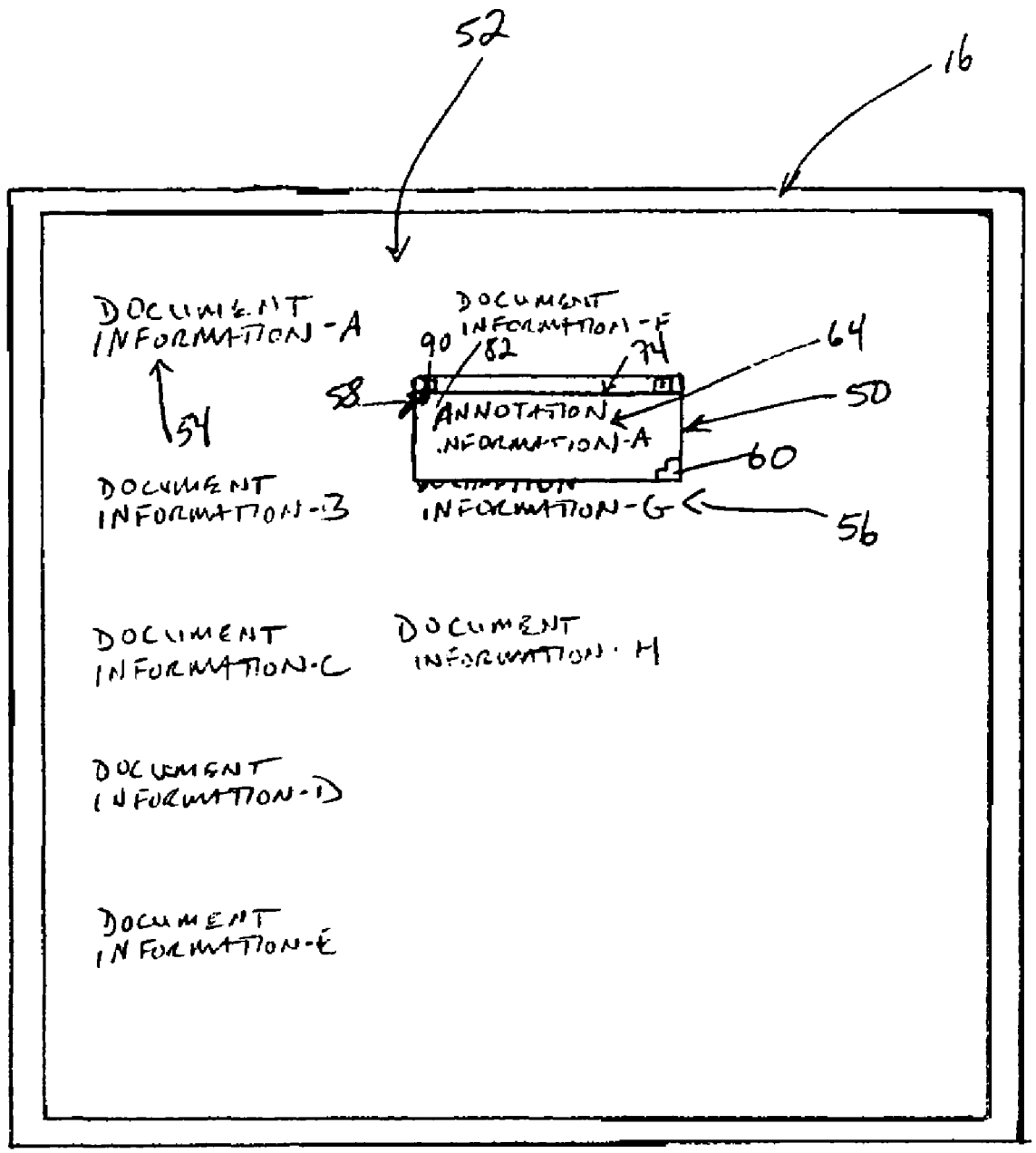

For purposes of facilitating review of an electronic document having a plurality of annotations, the method of the present invention may also include the step of concealing 180 at least the first reference link between the first annotation box and the first portion of the electronic document to which the first annotation associated with the first annotation box refers. Concealing the first reference link may include the steps of receiving another input, concealing from display the first reference link and providing an internal record of the first reference link. For example, as illustrated in FIGS. 12A-12B, a person using a computer mouse device may manipulate the mouse to move a displayable cursor 58 associated therewith to the fifth region 90 (e.g., link box) of the annotation box 50, proximate an end of the reference link 88, and "click" the mouse to command the system 10 to conceal or to delete the reference link 88 to form a new reference link, substantially as described hereinabove. A person may also again "click" the mouse when the cursor 58 is on the fifth region 90 to reveal a concealed reference link. As such, a viewer of the electronic document can recall the first reference link such that the first reference link is displayable or revealable to a viewer.

In one embodiment, the third processing means 46 is capable of concealing 180 and revealing 182 the reference link 88 between at least the first annotation box 50 and the first portion 54 of the electronic document 52 to which the first annotation 64 associated with the first annotation box 50 relates, in accordance with a computer software program of the present invention. Such a computer program for concealing and/or drawing such a reference link 88 is encoded in a computer memory, and generally involves detecting a mouse down in the annotation link box (e.g., fifth region 90), calculating the bounds of the link box, and, if the current mouse location is within the bounds of the link box, toggling the visibility flag (e.g. a variable) in the annotation data structure. In this regard, toggling the flag by actuating and deactuating the mouse in the link box conceals and draws the reference link 88.

In order to accommodate instances where the first person 12 or a viewer of the annotated electronic document wishes to move the first annotation box 50, shown in FIGS. 8A-8B, from a first location 68 to a second location 70, relative to the first portion 54 of the electronic document 52, while preserving the reference link 88 between the first annotation box 50 and the first portion 54 of the electronic document 52, the method of the present invention, illustrated in FIGS. 4A-4B and 5A-5B, also includes the steps of receiving 184 another input and reconfiguring 186 the first reference link 88 to maintain the link between the first annotation box 50 and first portion 54 of the document 52. Such reconfiguring of the first reference link 88 is accomplished by a processing means 48 for reconfiguring the reference link, which includes a computer program encoded in a computer memory. Such a computer program is capable of maintaining a first reference link 88 between a first annotation box 50 and the first portion 54 of the electronic document 52 to which the first annotation 64 relates, even in instances where the first person 12 wishes to move the first annotation box 50, and associated first annotation 64, from a first location 68 to a second location 70.

In one embodiment, the computer program for maintaining at least the first reference link 88 between the first annotation box 50 and the first portion 54 of the electronic document 52 in instances where the first annotation box 50, and associated annotation 64 is moved from a first location 68 to a second location 70, generally involves detecting whether a mouse down (e.g., actuated mouse) is in the annotation drag bar (e.g., second region 74), initializing the previous mouse location and, while the mouse is still down, getting the current mouse location, calculating the amount of horizontal and vertical deltas of the annotation box, getting the current bounds of the annotation box from the annotation data structure, offsetting the current bounds by the horizontal and vertical deltas, setting the current bounds in the annotation data structure, creating the actual reference link (e.g., an arrow) and drawing the annotation box with the reference link (e.g., arrow). Creating the actual arrow (i.e., reference link) generally involves storing the arrow by using the final arrow location from the annotation data structure and a point within the link box (e.g., fifth region 90) to create a structure or region in the shape of an arrow and storing the structure in the annotation data structure. Drawing the arrow (i.e., reference link) may involve drawing the body of the annotation box, the drag bar, the link box, the zoom box, the annotation text and, if the annotation arrow region or structure exists and is visible, drawing the arrow region, and drawing the sizer box.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for annotating at least a first portion of a first electronic document displayable to a first person via a display screen, comprising the steps of:

receiving at least a first input from the first person;

generating, in response to at least the first input, at least one of a first annotation and a first annotation box displayable to the first person via a window of the display screen, wherein the first annotation is displayable within the first annotation box, the first annotation box being positioned a distance away from the first text portion of the first electronic document, over a second text portion of the first electronic document, such that the first text portion of the first electronic document and said at least one of the first annotation and the first annotation box are displayable simultaneously in the window;

linking said at least one of the first annotation and the first annotation box with the first text portion of the first electronic documents via a displayable first referencer, wherein the first referencer comprises one of a displayable arrow and a displayable line extending between the first text portion of the first electronic document and said at least one of the first annotation box and the first annotation;

receiving at least a second input from the first person, the second input corresponding to relating at least one of the first annotation aid the first annotation box with the first portion of the first electronic document via the first referencer;

within the window of the display screen, generating, from the second input, the first referencer to link at least one of the first annotation and the first annotation box with the first portion of the first electronic document, wherein the first referencer is wholly displayed with in the window without crossing boundaries of other displayed windows in the display screen;

receiving at least a third input from the first person, wherein the third input corresponds to moving at least one of the first annotation and the first annotation box from a first location relative to the first portion of the first electronic document to a second location relative to the first portion of the first electronic document, and reconfiguring the first referencer to link at least one of the first annotation box and the first annotation at the second location with the first text portion of the first electronic document, wherein the first end of the first referencer is moved from a first position proximate the first location to a second position, where the second location is determined relative to at least one of the first position of the first end and the first text portion of the first electronic document, and is proximate the second location; and positioning the first end of the first referencer at the second position, proximate the second location, along with at least one of the first annotation box and the first annotation.

2. A method, as claimed in claim 1, further comprising the steps of:

displaying at least the first text portion of the first electronic document to at least one of the first person and a first viewer of the first electronic document via the window of the display screen;

displaying, over a second text portion of the first electronic documents, at least one of the first annotation and first annotation box to at least one of the first person and the first viewer of the first electronic document via the window of the display screen; and displaying at least the first referencer to at least one of the first person and the first viewer of the first electronic document via the window of the display screen.

3. A method, as claimed in claim 1, wherein the first referencer includes first and second ends, wherein the first end corresponds to at least one of the first annotation and the first annotation box and the second end corresponds to the first text portion of the first electronic document to which the first annotation applies, wherein said step of generating the first referencer comprises the steps of:

determining first and second positions of the first and second ends of the first referencer, respectively, relatively, relative to at least the first electronic document, the first position being different than the second position.

4. A method, as claimed in claim 3, wherein said receiving at least the second input includes the step of:

collecting from the first person one of a plurality of voice inputs, a plurality of touch-screen inputs, a plurality of keystroke inputs and plurality of computer mouse inputs corresponding to the first and second positions of first and second ends, respectively, of the first referencer.

5. A method, as claimed in claim 3, wherein said generating the first referencer includes the step of sorting at least the first and second positions of the first and second ends, respectively, to provide a record of the first referencer.

6. A method, as claimed in claim 1, wherein said step of receiving the first input includes the step of collecting at least one of a voice input, a touch-screen input, a keystroke input and a computer mouse input corresponding to at least one of the first annotation and first annotation box.

7. A method, as claimed in claim 1, further comprising the step of:

receiving at least a third input from the first person in a specified region of the first annotation box, wherein the third input corresponds to one of enlarging and collapsing the first annotation box to predetermined sizes, wherein at least the first part of the first annotation is displayable to the first person in an enlarged first annotation box, wherein at least the first part of the first annotation is screened from view of the first person in a collapsed first annotation box; and reconfiguring, in response to the third input, the first annotation box to one of the enlarged state and the collapsed state.

8. A method, as claimed in claim 1, further comprising the steps of:

displaying, within the first annotation box and via the display screen, at least a first part of the text of the first annotation; and displaying the first referencer link between the first annotation box and the first portion of the first electronic document to which the first annotation refers.

9. A system for annotating at least a first portion of a first electronic document displayable to a first person via an area of a display screen, said system comprising:

means for receiving a plurality of inputs from the first person, wherein a first of the plurality of inputs concerns generating at least one of a first annotation and a first annotation box displayable within the area of the display screen at a first location over a second portion of the first electronic document different than the first portion of the first electronic document to at least the first person and a second of the plurality of inputs from the first person concerns linking said at least one of said first annotation and said first annotation box to the first portion of the first electronic document wherein the first annotation and the first annotation box created by the plurality of inputs are associated with the first document such that the first annotation and the first annotation box are accessible when the first document is accessed;

first means, associated with said means for receiving, for processing the first of the plurality of inputs to generate said at least one of said first annotation and said first annotation box displayable to at least the first person via the display screen over the second portion of the first electronic document;

second means, associated with said means for receiving, for processing the second of the plurality of inputs, to establish a first referencer link between said at least one said first annotation and said first annotation box and the first portion of the first electronic document, wherein said first referencer link is wholly displayable to at least the first person in the area of the display screen without crossing from one window to another window, wherein said first referencer link comprises one of a line and an arrow, and said first referencer link includes a first end associated with at least one of said first annotation and said first annotation box and a second end associated with the first portion of the first electronic document to which one of said first annotation and said first annotation box pertains;

third means, associated with said receiving means, for processing a third of the plurality of inputs to position, relative to the first portion of the first electronic document, at least one of said first annotation and said first annotation box from the first location to a second location; and means, associated with said means for receiving, for reconfiguring in the area of the display screen said first referencer link to move said first end of said first referencer link with at least one of said first annotation and said first annotation box from the first location to a second location, wherein said second end of said first referencer link remains associated with the first portion of the first electronic document, and wherein the first referencer link, the first annotation box, and the first portion of the electronic document are concurrently displayed in the area of the display screen.

10. A system, as claimed in claim 9, wherein the first of the plurality of inputs concerns generating said first annotation box, wherein a third of the plurality of inputs from the first person concerns the first annotation, said system further comprising:

means, associated with said means for receiving, for processing the third of the plurality of inputs to generate text of a first annotation, wherein at least a first part of the first annotation is displayable to at least the first person within the first annotation box, via the area of the display screen.

11. A system, as claimed in claim 9, wherein said means for receiving comprises a receiver capable of collecting at least one of a plurality of keystroke inputs, computer mouse inputs, touch-screen inputs and voice inputs.

12. A system, as claimed in claim 9, further comprising:

third means, associated with said means for receiving, for processing in a selected area of said first annotation box a third of the plurality of inputs to reconfigure said first annotation box one of a collapsed condition and an enlarged condition, wherein said first Notation box in said collapsed condition conceals from display at least a first part of said first annotation and said first annotation box in said enlarged condition displays at least said first part of said first annotation.

13. A system, as claimed in claim 9, further comprising:

means associated with said means for receiving, for storing said first referencer link in a memory associated with said second means for processing.

14. A system, as claimed in claim 9, further comprising:

means, associated with said means for receiving, for concealing said first referencer link from display to at least the first person via the display screen.

15. A system, as claimed in claim 9, wherein at least one of said first annotation and said first annotation box is positioned at a first location relative to the first portion of the first electronic document, wherein said system further comprises:

means, associated with said receiving means, for processing a third of the plurality of input to position, relative to the first portion of the first electronic document, at least one of said first annotation and said first annotation box from the first location to a second location.

* * * * *

UNITED STATES PATENT AND TRADEMARK OFFICE
CERTIFICATE OF CORRECTION

PATENT NO. : 7,432,938 B1 Page 1 of 1
APPLICATION NO. : 08/699261
DATED : October 7, 2008
INVENTOR(S) : Reuter et al.

It is certified that error appears in the above-identified patent and that said Letters Patent is hereby corrected as shown below:

Column 13, line 58, delete "aid", and insert therefor --and--.
Column 16, line 35, delete "Notation", and insert therefor --annotation--.

Signed and Sealed this

Eighteenth Day of November, 2008

JON W. DUDAS
*Director of the United States Patent and Trademark Office*